United States Patent
Takeda et al.

(10) Patent No.: US 12,109,783 B2
(45) Date of Patent: Oct. 8, 2024

(54) INTERMEDIATE FILM FOR LAMINATED GLASS, AND LAMINATED GLASS

(71) Applicant: SEKISUI CHEMICAL CO., LTD., Osaka (JP)

(72) Inventors: Yuuma Takeda, Kouka (JP); Tatsuya Iwamoto, Kouka (JP); Yuki Ishikawa, Osaka (JP); Shinji Kawada, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 247 days.

(21) Appl. No.: 17/623,011

(22) PCT Filed: Nov. 20, 2019

(86) PCT No.: PCT/JP2019/045503
§ 371 (c)(1),
(2) Date: Dec. 27, 2021

(87) PCT Pub. No.: WO2021/002035
PCT Pub. Date: Jan. 7, 2021

(65) Prior Publication Data
US 2022/0288896 A1      Sep. 15, 2022

(30) Foreign Application Priority Data
Jul. 2, 2019   (JP) ................. 2019-123790

(51) Int. Cl.
*B32B 17/10*      (2006.01)
*B32B 7/12*       (2006.01)
(52) U.S. Cl.
CPC .......... *B32B 17/10605* (2013.01); *B32B 7/12* (2013.01); *B32B 17/10036* (2013.01);
(Continued)
(58) Field of Classification Search
None
See application file for complete search history.

(56) References Cited

U.S. PATENT DOCUMENTS

| 2012/0244329 A1 | 9/2012 | Iwamoto et al. |
| 2012/0244364 A1 | 9/2012 | Iwamoto et al. |

(Continued)

FOREIGN PATENT DOCUMENTS

| CN | 106132895 | 11/2016 |
| CN | 106660866 | 5/2017 |

(Continued)

OTHER PUBLICATIONS

International Search Report (ISR) issued Feb. 18, 2020 in International (PCT) Application No. PCT/JP2019/045503.

(Continued)

*Primary Examiner* — Ramsey Zacharia
(74) *Attorney, Agent, or Firm* — WENDEROTH, LIND & PONACK, L.L.P.

(57) ABSTRACT

Provided is an interlayer film for laminated glass capable of suppressing the generation of an optical strain in laminated glass, and enhancing the damping performance of laminated glass. An interlayer film for laminated glass according to the present invention is an interlayer film for laminated glass having a one-layer or two or more-layer structure, and includes a first layer containing a resin, and when the interlayer film is arranged between two sheets of clear float glass having a thickness of 2.5 mm to obtain a laminated glass X with a size of 150 mm in length and 300 mm in width, and the obtained laminated glass X is subjected to a specific measurement of optical strain, an optical strain value is 3.00 or less, whereas when the interlayer film is arranged between two sheets of clear float glass having a thickness of 2.1 mm to obtain a laminated glass Y having a size of 950 mm in length and 1500 mm in width, and the obtained laminated glass Y is subjected to a specific measurement of damping ratio, a damping ratio at a resonance (Continued)

frequency of 50 Hz or more and 80 Hz or less is 5.0% or more.

23 Claims, 3 Drawing Sheets

(52) U.S. Cl.
CPC .. *B32B 17/10743* (2013.01); *B32B 17/10761* (2013.01); *B32B 17/10935* (2013.01); *B32B 2250/03* (2013.01); *B32B 2250/40* (2013.01); *B32B 2307/102* (2013.01); *B32B 2307/412* (2013.01); *B32B 2307/418* (2013.01); *B32B 2307/558* (2013.01); *B32B 2605/006* (2013.01); *B32B 2605/08* (2013.01)

(56) References Cited

U.S. PATENT DOCUMENTS

| | | |
|---|---|---|
| 2014/0093739 A1 | 4/2014 | Iwamoto et al. |
| 2014/0227536 A1 | 8/2014 | Iwamoto et al. |
| 2015/0030860 A1 | 1/2015 | Shimamoto et al. |
| 2016/0311200 A1 | 10/2016 | Yoshida et al. |
| 2017/0136743 A1 | 5/2017 | Yoshida et al. |
| 2017/0182745 A1 | 6/2017 | Iwamoto et al. |
| 2017/0182746 A1 | 6/2017 | Iwamoto et al. |
| 2017/0182747 A1 | 6/2017 | Iwamoto et al. |
| 2017/0182748 A1 | 6/2017 | Iwamoto et al. |
| 2017/0197395 A1 | 7/2017 | Iwamoto et al. |
| 2017/0246842 A1 | 8/2017 | Iwamoto et al. |
| 2017/0313033 A1 | 11/2017 | Iwamoto et al. |
| 2017/0320297 A1 | 11/2017 | Bennison et al. |
| 2017/0334173 A1 | 11/2017 | Yui et al. |
| 2017/0361575 A1 | 12/2017 | Kusudou et al. |
| 2018/0117883 A1* | 5/2018 | Olson ................ B32B 3/02 |
| 2018/0290436 A1 | 10/2018 | Yui et al. |
| 2018/0290437 A1 | 10/2018 | Kobayashi et al. |
| 2018/0290439 A1 | 10/2018 | Kusudou et al. |
| 2019/0193377 A1 | 6/2019 | Shimamoto et al. |
| 2019/0375196 A1 | 12/2019 | Yui et al. |
| 2020/0017675 A1 | 1/2020 | Isque et al. |
| 2020/0023620 A1 | 1/2020 | Isoue et al. |
| 2020/0094529 A1 | 3/2020 | Iwamoto et al. |
| 2020/0171798 A1 | 6/2020 | Sakamoto et al. |
| 2020/0198301 A1 | 6/2020 | Iwamoto et al. |
| 2020/0346438 A1 | 11/2020 | Iwamoto et al. |
| 2022/0371305 A1 | 11/2022 | Iwamoto et al. |

FOREIGN PATENT DOCUMENTS

| | | |
|---|---|---|
| CN | 107710035 | 2/2018 |
| JP | 7-97240 | 4/1995 |
| JP | 9-295782 | 11/1997 |
| JP | 2000-177062 | 6/2000 |
| JP | 2006-22238 | 1/2006 |
| JP | 2007-270133 | 10/2007 |
| JP | 2013-6726 | 1/2013 |
| JP | 2016-107632 | 6/2016 |
| JP | 2016-108226 | 6/2016 |
| JP | 2016-183077 | 10/2016 |
| JP | 2016-193804 | 11/2016 |
| JP | 2017-178676 | 10/2017 |
| JP | 2018-188356 | 11/2018 |
| WO | 2011/081190 | 7/2011 |
| WO | 2013/105657 | 7/2013 |
| WO | 2015/019441 | 2/2015 |
| WO | 2015/071343 | 5/2015 |
| WO | 2016/039473 | 3/2016 |
| WO | 2018/212332 | 11/2018 |

OTHER PUBLICATIONS

International Preliminary Report on Patentability and Written Opinion of the International Searching Authority issued Dec. 28, 2021 in International (PCT) Application No. PCT/JP2019/045503.
Extended European Search Report issued Jun. 28, 2023 in corresponding European Patent Application No. 19936058.7.
Corroyer et al., "Characterization of Commercial Polyvinylbutyrals", International Journal of Polymer Anaylsis and Characterization, vol. 18, No. 5, pp. 346-357, 2013.
Decision of Refusal mailed Aug. 20, 2024 in corresponding Japanese Patent Application No. JP 2019-567389, with English translation.

* cited by examiner

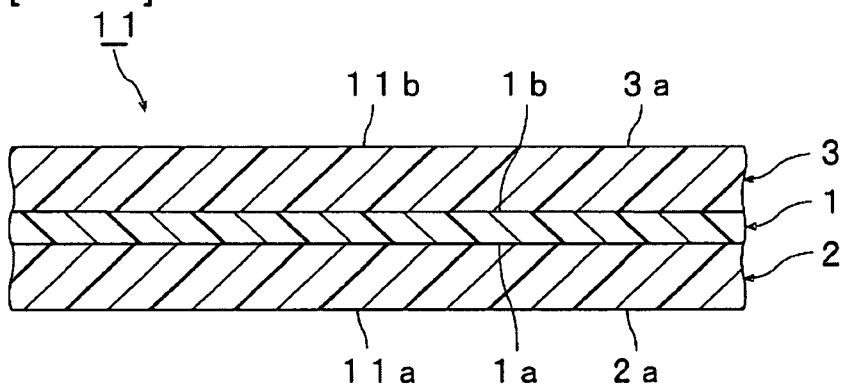
[FIG. 1]
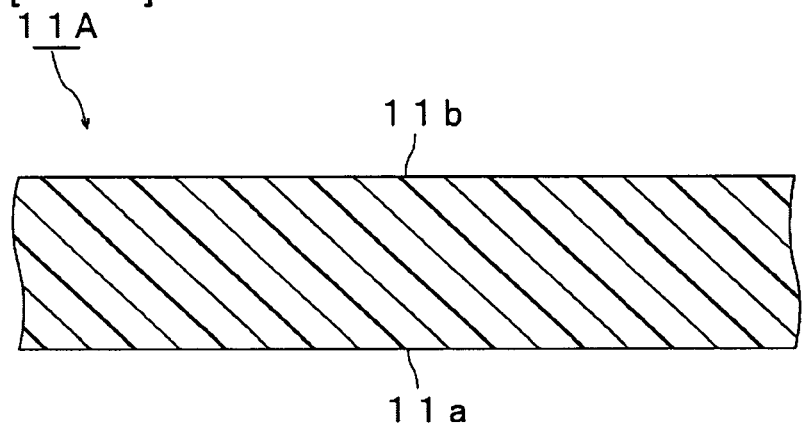
[FIG. 2]
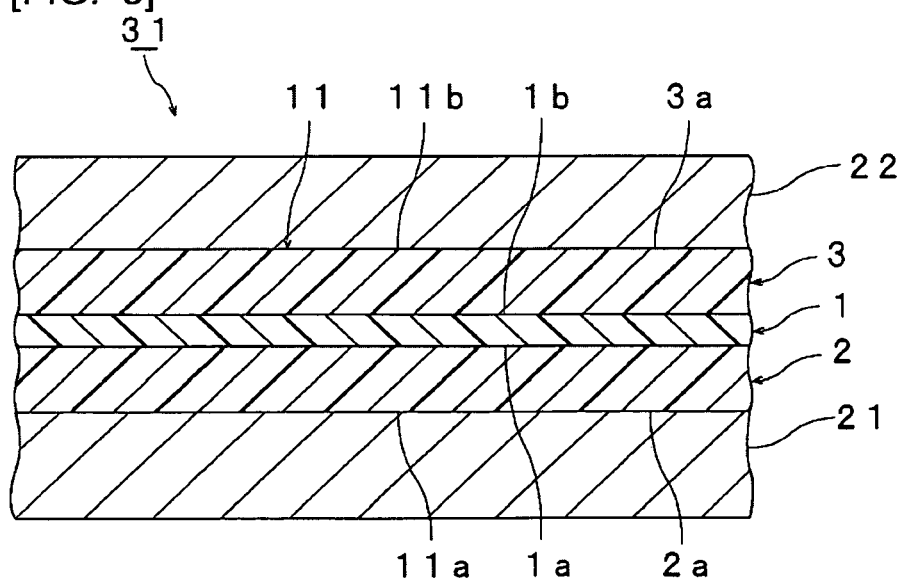
[FIG. 3]

[FIG. 4]
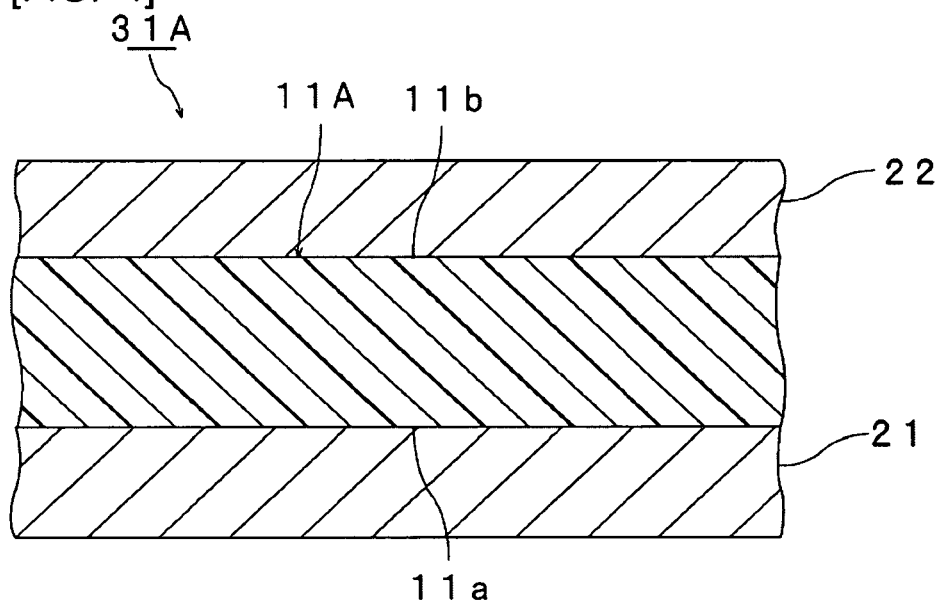
[FIG. 5]
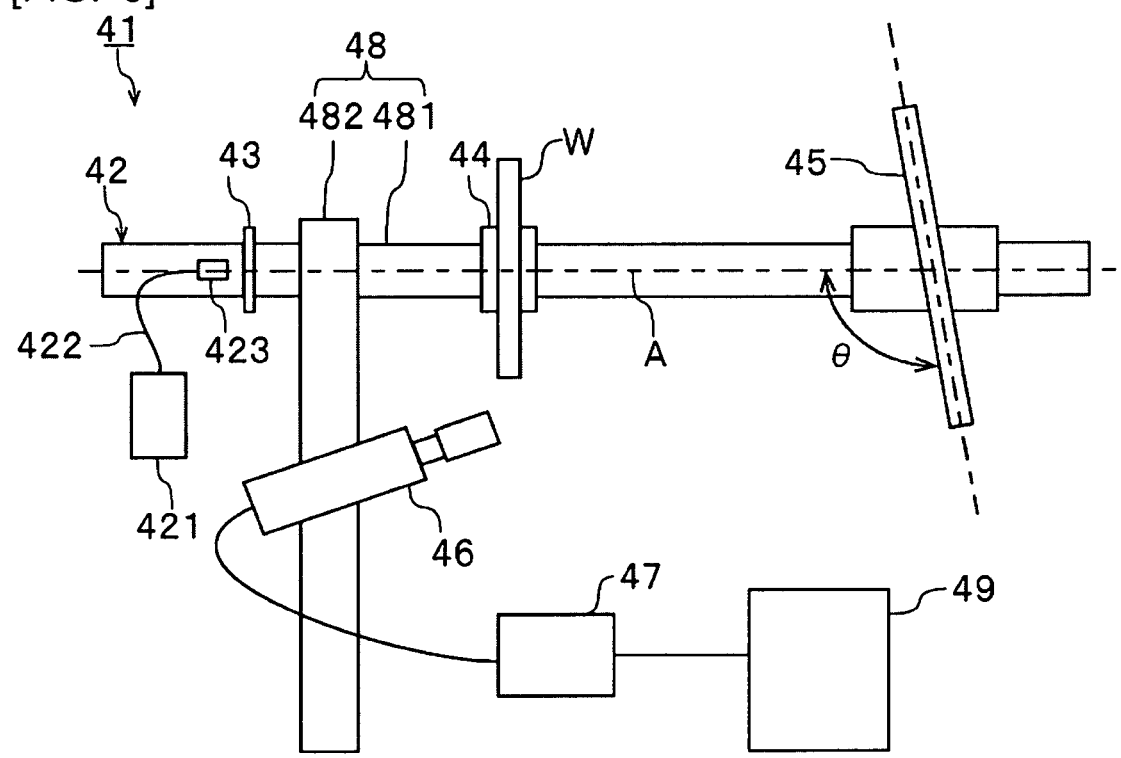

[FIG. 6]
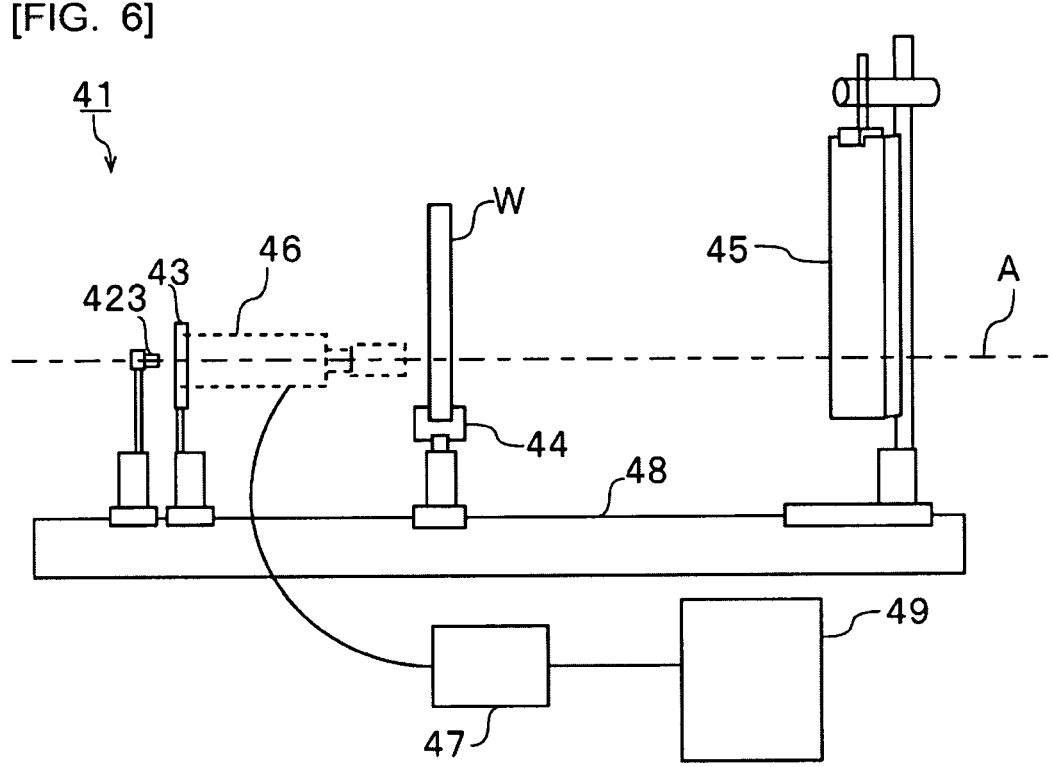

INTERMEDIATE FILM FOR LAMINATED GLASS, AND LAMINATED GLASS

TECHNICAL FIELD

The present invention relates to an interlayer film for laminated glass which is used for obtaining laminated glass. Moreover, the present invention relates to a laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between two glass plates.

As one example of the interlayer film for laminated glass, the following Patent Document 1 discloses an interlayer film for laminated glass including a first layer, and a second layer layered on a first surface of the first layer, wherein the first layer contains a polyvinyl acetate resin and a plasticizer.

The following Patent Document 2 discloses a laminate having an A layer and a plurality of B layers, the A layer comprising a resin composition having a peak at which tan δ measured by a complex shear viscosity test under the condition of a frequency of 1 Hz in accordance with JIS K7244-10 peaks, within the range of −40 to 30° C., wherein the A layer is layered between at least two B layers. In the laminate, when the laminate is sandwiched between two sheets of float glass having a length of 300 mm, a width of 25 mm and a thickness of 1.9 mm, a loss factor at a fourth resonance frequency measured by a central exciting method at 20° C. is 0.2 or more, and a flexural rigidity at the fourth resonance frequency calculated in accordance with ISO16940 (2008) is 150 N·m or more.

The following Patent Document 3 discloses an interlayer film for laminated glass wherein when a laminated glass obtained by sandwiching the interlayer film between two sheets of glass having a width of 50 mm, a length of 300 mm and a thickness of 3 mm is measured for a loss factor in a third mode in a dumping test of the laminated glass by a central exciting method, a width of the temperature range where the loss factor is 0.2 or more is 15° C. or more.

RELATED ART DOCUMENTS

Patent Documents

Patent Document 1: WO2013/105657A1
Patent Document 2: JP 2016-107632 A
Patent Document 3: JP 2016-108226 A

SUMMARY OF THE INVENTION

Problems to be Solved by the Invention

In the laminated glasses prepared with the interlayer films according to Patent Documents 1 to 3, although the damping performance can be enhanced to some extent, an optical strain may be generated. In a conventional laminated glass that is designed to suppress the generation of an optical strain, the damping performance may deteriorate. Thus, in laminated glasses prepared with conventional interlayer films, it is difficult to suppress the generation of an optical strain, and to enhance the damping performance.

It is an object of the present invention to provide an interlayer film for laminated glass capable of suppressing the generation of an optical strain in laminated glass, and enhancing the damping performance of laminated glass. It is also an object of the present invention to provide a laminated glass prepared with the interlayer film for laminated glass.

Means for Solving the Problems

According to a broad aspect of the present invention, there is provided an interlayer film for laminated glass (in the present specification, "interlayer film for laminated glass" is sometimes abbreviated as "interlayer film") having a one-layer or two or more-layer structure, the interlayer film includes a first layer containing a resin, and when the interlayer film is arranged between two sheets of clear float glass having a thickness of 2.5 mm to obtain a laminated glass X with a size of 150 mm in length and 300 mm in width, and the obtained laminated glass X is subjected to the following measurement of optical strain, an optical strain value is 3.00 or less, whereas when the interlayer film is arranged between two sheets of clear float glass having a thickness of 2.1 mm to obtain a laminated glass Y having a size of 950 mm in length and 1500 mm in width, and the obtained laminated glass Y is subjected to the following measurement of damping ratio, a damping ratio at a resonance frequency of 50 Hz or more and 80 Hz or less is 5.0% or more.

Measurement of optical strain: an optical strain inspection apparatus including a light source unit for emitting irradiation light, a projection plane for projecting the irradiation light having penetrated a measuring object, an image inputting part that photographs the projection plane to generate a gray image, and an image processing part that detects an optical strain in a longitudinal direction and in a widthwise direction of the measuring object on the basis of a degree of variation in shading of the gray image is prepared. As the measuring object, two measuring objects, namely, the laminated glass X, and a laminated glass for calibration obtained by arranging a monolayer interlayer film for calibration having a visible light transmittance of 88% between two sheets of clear float glass having a thickness of 2.5 mm are prepared. An optical strain value of the laminated glass X is measured by using the optical strain inspection apparatus that is adjusted such that the optical strain value in a condition that no measuring object is placed is 1.30, and an optical strain value of the laminated glass for calibration is 1.14. Measurement conditions include an atmospheric temperature of 23° C. and a surface temperature of the measuring object of 25° C. Of the obtained optical strain value in the longitudinal direction of the measuring object, and the obtained optical strain value in the widthwise direction of the measuring object, a smaller optical strain value is determined as an optical strain value of the measuring object.

Measurement of damping ratio: a first surface of the laminated glass Y is divided into regions such that each region has a length of 5 cm or less and a width of 5 cm or less. A longitudinal length of the laminated glass Y is given as $L_1$, a widthwise length is given as $L_2$, and one vertex of the first surface is given as vertex O. At this time, in the first surface of the laminated glass Y, an accelerometer is installed at three positions: a position of $0.3L_1$ in the longitudinal direction and $0.3L_2$ in the widthwise direction from the vertex O, a position of $0.7L_1$ in the longitudinal direction and $0.5L_2$ in the widthwise direction from the vertex O, and a position of $0.6L_1$ in the longitudinal direction and $0.8L_2$ in the widthwise direction from the vertex O. In each of the above regions, a middle position in the longitudinal direction and a middle position in the widthwise direction of the region in the first surface is exited with an impact hammer, and a transfer function is calculated. According to the obtained transfer function, a damping ratio at a resonance frequency of 50 Hz or more and 80 Hz or less is calculated.

In a specific aspect of the interlayer film according to the present invention, the resin contained in the first layer has a molecular weight distribution ratio of weight average molecular weight to number average molecular weight of 8 or less.

In a specific aspect of the interlayer film according to the present invention, the resin contained in the first layer has a glass transition temperature of 40° C. or more and 100° C. or less.

In a specific aspect of the interlayer film according to the present invention, the first layer has a tan δ at the glass transition temperature of 1.2 or more.

In a specific aspect of the interlayer film according to the present invention, the first layer has a tan δ at 200° C. of 0.5 or more.

In a specific aspect of the interlayer film according to the present invention, the first layer has a refractive index of 1.470 or more and 1.510 or less.

In a specific aspect of the interlayer film according to the present invention, the first layer contains a plasticizer.

In a specific aspect of the interlayer film according to the present invention, the interlayer film has a two or more-layer structure, and includes a second layer that is layered on a first surface of the first layer and contains a resin.

In a specific aspect of the interlayer film according to the present invention, the second layer has a refractive index of 1.460 or more and 1.500 or less.

In a specific aspect of the interlayer film according to the present invention, an absolute value of difference between a refractive index of the first layer and a refractive index of the second layer is 0.04 or less.

In a specific aspect of the interlayer film according to the present invention, the interlayer film has a three or more-layer structure, and includes a third layer that is layered on a second surface opposite to the first surface of the first layer and contains a resin.

According to a broad aspect of the present invention, there is provided a laminated glass including a first lamination glass member, a second lamination glass member, and the above-described interlayer film, the interlayer film for laminated glass being arranged between the first lamination glass member and the second lamination glass member.

According to a broad aspect of the present invention, there is provided a laminated glass including a first lamination glass member, a second lamination glass member, and an interlayer film for laminated glass having a one-layer or two or more-layer structure, and the interlayer film includes a first layer containing a resin, and the laminated glass showing an optical strain value of 3.00 or less when subjected to the following measurement of optical strain, and showing a damping ratio of 5.0% or more at a resonance frequency of 50 Hz or more and 80 Hz or less when subjected to the following measurement of damping ratio.

Measurement of optical strain: an optical strain inspection apparatus including a light source unit for emitting irradiation light, a projection plane for projecting the irradiation light having penetrated a measuring object, an image inputting part that photographs the projection plane to generate a gray image, and an image processing part that detects an optical strain in a longitudinal direction and in a widthwise direction of the measuring object on the basis of a degree of variation in shading of the gray image is prepared. As the measuring object, two measuring objects, namely, the laminated glass, and a laminated glass for calibration obtained by arranging a monolayer interlayer film for calibration having a visible light transmittance of 88% between two sheets of clear float glass having a thickness of 2.5 mm are prepared. An optical strain value of the laminated glass is measured by using the optical strain inspection apparatus that is adjusted such that the optical strain value in a condition that no measuring object is placed is 1.30, and an optical strain value of the laminated glass for calibration is 1.14. Measurement conditions include an atmospheric temperature of 23° C. and a surface temperature of the measuring object of 25° C. Of the obtained optical strain value in the longitudinal direction of the measuring object, and the obtained optical strain value in the widthwise direction of the measuring object, a smaller optical strain value is determined as an optical strain value of the measuring object.

Measurement of damping ratio: a first surface of the laminated glass is divided into regions such that each region has a length of 5 cm or less and a width of 5 cm or less. A longitudinal length of the laminated glass is given as $L_1$, a widthwise length is given as $L_2$, and one vertex of the first surface is given as vertex O. At this time, in the first surface of the laminated glass, an accelerometer is installed at three positions: a position of $0.3L_1$ in the longitudinal direction and $0.3L_2$ in the widthwise direction from the vertex O, a position of $0.7L_1$ in the longitudinal direction and $0.5L_2$ in the widthwise direction from the vertex O, and a position of $0.6L_1$ in the longitudinal direction and $0.8L_2$ in the widthwise direction from the vertex O. In each of the above regions, a middle position in the longitudinal direction and a middle position in the widthwise direction of the region in the first surface is exited with an impact hammer, and a transfer function is calculated. According to the obtained transfer function, a damping ratio at a resonance frequency of 50 Hz or more and 80 Hz or less is calculated.

In a specific aspect of the laminated glass according to the present invention, the resin contained in the first layer has a molecular weight distribution ratio of weight average molecular weight to number average molecular weight of 8 or less.

In a specific aspect of the laminated glass according to the present invention, the resin contained in the first layer has a glass transition temperature of 40° C. or more and 100° C. or less.

In a specific aspect of the laminated glass according to the present invention, the first layer has a tan δ at the glass transition temperature of 1.2 or more.

In a specific aspect of the laminated glass according to the present invention, the first layer has a tan δ at 200° C. of 0.5 or more.

In a specific aspect of the laminated glass according to the present invention, the first layer has a refractive index of 1.470 or more and 1.510 or less.

In a specific aspect of the laminated glass according to the present invention, the first layer contains a plasticizer.

In a specific aspect of the laminated glass according to the present invention, the interlayer film has a two or more-layer structure, and the interlayer film includes a second layer that is layered on a first surface of the first layer and contains a resin.

In a specific aspect of the laminated glass according to the present invention, the second layer has a refractive index of 1.460 or more and 1.500 or less.

In a specific aspect of the laminated glass according to the present invention, an absolute value of difference between a refractive index of the first layer and a refractive index of the second layer is 0.04 or less.

In a specific aspect of the laminated glass according to the present invention, the interlayer film has a three or more-layer structure, and the interlayer film includes a third layer that is layered on a second surface opposite to the first surface of the first layer and contains a resin.

Effect of the Invention

The interlayer film for laminated glass according to the present invention has a one-layer or a two or more-layer structure. The interlayer film for laminated glass according to the present invention includes a first layer containing a resin. An interlayer film for laminated glass according to the present invention is arranged between two sheets of clear float glass having a thickness of 2.5 mm to obtain a laminated glass X having a size of 150 mm in length and 300 mm in width. When the obtained laminated glass X is subjected to the measurement of optical strain, the optical strain value is 3.00 or less. An interlayer film for laminated glass according to the present invention is arranged between two sheets of clear float glass having a thickness of 2.1 mm to obtain a laminated glass Y having a size of 950 mm in length and 1500 mm in width. When the obtained laminated glass Y is subjected to the measurement of damping ratio, the damping ratio is 5.0% or more at a resonance frequency of 50 Hz or more and 80 Hz or less. In the interlayer film for laminated glass according to the present invention, since the above configuration is provided, it is possible to suppress the generation of an optical strain in laminated glass, and to enhance the damping performance of laminated glass.

The laminated glass according to the present invention includes a first lamination glass member, a second lamination glass member, and an interlayer film for laminated glass having a one-layer or two or more-layer structure. In the laminated glass according to the present invention, the interlayer film includes a first layer containing a resin. In the laminated glass according to the present invention, when the measurement of optical strain is conducted, the optical strain value is 3.00 or less. In the laminated glass according to the present invention, when the measurement of damping ratio is conducted, the damping ratio is 5.0% or more at a resonance frequency of 50 Hz or more and 80 Hz or less. In the laminated glass according to the present invention, since the above configuration is provided, it is possible to suppress the generation of an optical strain, and to enhance the damping performance.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

FIG. 5 is a plan view schematically showing an optical strain inspection apparatus for use in measurement of optical strain.

FIG. 6 is a front view schematically showing an optical strain inspection apparatus for use in measurement of optical strain.

MODE(S) FOR CARRYING OUT THE INVENTION

Hereinafter, the details of the present invention will be described.

(Interlayer Film for Laminated Glass)

The interlayer film for laminated glass according to the present invention (hereinafter, sometimes abbreviated as "interlayer film") has a one-layer structure or a two or more-layer structure. The interlayer film according to the present invention includes a first layer containing a resin.

An interlayer film for laminated glass according to the present invention is arranged between two sheets of clear float glass having a thickness of 2.5 mm to obtain a laminated glass X having a size of 150 mm in length and 300 mm in width. When the obtained laminated glass X is subjected to the following measurement of optical strain, the optical strain value is 3.00 or less.

Measurement of optical strain: an optical strain inspection apparatus including a light source unit for emitting irradiation light, a projection plane for projecting the irradiation light having passed through a measuring object, an image inputting part that photographs the projection plane to generate a gray image, and an image processing part that detects an optical strain in a longitudinal direction and in a widthwise direction of the measuring object on the basis of a degree of variation in shading of the gray image is prepared. As the measuring object, two measuring objects, namely, the laminated glass X, and a laminated glass for calibration obtained by arranging a monolayer interlayer film for calibration having a visible light transmittance of 88% between two sheets of clear float glass having a thickness of 2.5 mm are prepared. An optical strain value of the laminated glass X is measured by using the optical strain inspection apparatus that is adjusted such that the optical strain value in a condition that no measuring object is placed is 1.30, and an optical strain value of the laminated glass for calibration is 1.14. Measurement conditions include an atmospheric temperature of 23° C. and a surface temperature of the measuring object of 25° C. Of the obtained optical strain value in the longitudinal direction of the measuring object, and the obtained optical strain value in the widthwise direction of the measuring object, a smaller optical strain value is determined as an optical strain value of the measuring object.

An interlayer film for laminated glass according to the present invention is arranged between two sheets of clear float glass having a thickness of 2.1 mm to obtain a laminated glass Y having a size of 950 mm in length and 1500 mm in width. When the obtained laminated glass Y is subjected to the following measurement of damping ratio, the damping ratio is 5.0% or more at a resonance frequency of 50 Hz or more and 80 Hz or less.

Measurement of damping ratio: a first surface of the laminated glass Y is divided into regions such that each region has a length of 5 cm or less and a width of 5 cm or less. A longitudinal length of the laminated glass Y is given as $L_1$, a widthwise length is given as $L_2$, and one vertex of the first surface is given as vertex O. In the first surface of the laminated glass Y, an accelerometer is installed at three positions: a position of $0.3L_1$ in the longitudinal direction and $0.3L_2$ in the widthwise direction from the vertex O, a position of $0.7L_1$ in the longitudinal direction and $0.5L_2$ in the widthwise direction from the vertex O, and a position of $0.6L_1$ in the longitudinal direction and $0.8L_2$ in the widthwise direction from the vertex O. In each of the above regions, ae middle position in the longitudinal direction and a middle position in the widthwise direction of the region in the first surface is exited with an impact hammer, and a transfer function is calculated. According to the obtained transfer function, a damping ratio at a resonance frequency of 50 Hz or more and 80 Hz or less is calculated.

In the interlayer film according to the present invention, since the above configuration is provided, it is possible to suppress the generation of an optical strain in laminated glass, and to enhance the damping performance of laminated glass.

Also, in the interlayer film according to the present invention, since the above configuration is provided, it is possible to enhance the sound insulating property of laminated glass.

The interlayer film according to the present invention is capable of suppressing the generation of an optical strain, and enhancing the damping performance even when it is used in an automobile such as an electric vehicle in which noise at a low frequency region is problematic.

The interlayer film according to the present invention has a one-layer structure or a two or more-layer structure. The interlayer film according to the present invention may have a one-layer structure or may have a two or more-layer structure. The interlayer film according to the present invention may have a two-layer structure, may have a three-layer structure, or may have a three or more-layer structure. The interlayer film according to the present invention includes a first layer. The interlayer film according to the present invention may be a single-layered interlayer film including only a first layer or may be a multi-layered interlayer film including a first layer and other layer.

The interlayer film may have only a first layer, or may include a second layer in addition to the first layer. It is preferred that the interlayer film include a second layer as a surface layer of the interlayer film. It is preferred that the second layer be a surface layer of the interlayer film. When the interlayer film includes the second layer, the second layer is arranged on a first surface side of the first layer.

The interlayer film may have a three or more-layer structure and may include a third layer in addition to the first layer and the second layer. It is preferred that the interlayer film include a third layer as a surface layer of the interlayer film. It is preferred that the third layer be a surface layer of the interlayer film. When the interlayer film includes the second layer and the third layer, the third layer is arranged on a second surface side opposite to the first surface of the first layer.

An interlayer film according to the present invention is arranged between two sheets of clear float glass having a thickness of 2.5 mm to prepare a laminated glass X having a size of 150 mm in length and 300 mm in width.

The laminated glass X is prepared for conducting measurement of optical strain.

It is preferred that the laminated glass X be prepared in the following manner.

Two sheets of clear float glass in conformity with JIS R3202 having a thickness of 2.5 mm are prepared. The interlayer film is sandwiched between the two sheets of clear float glass to obtain a laminate X. The obtained laminate X is put into a rubber bag and the inside thereof is degassed for 20 minutes at a degree of vacuum of 2.6 kPa, after which the laminate is transferred into an oven while being degassed, and furthermore, retained at 90° C. for 30 minutes and pressed under vacuum, and thus the laminate X is preliminary press-bonded. The preliminarily press-bonded laminate X is subjected to press-bonding for 20 minutes under conditions of 135° C. and a pressure of 1.2 MPa in an autoclave to obtain a laminated glass X having a size of 150 mm in length and 300 mm in width.

The interlayer film in laminated glass may be peeled off from the lamination glass members to prepare the laminated glass X.

From the viewpoint of suppressing the generation of an optical strain in laminated glass, in the interlayer film according to the present invention, the optical strain value of the laminated glass X is 3.00 or less when the laminated glass X is subjected to the "measurement of optical strain".

From the viewpoint of further suppressing the generation of an optical strain, the optical strain value of the laminated glass X is preferably 2.00 or less, more preferably 1.45 or less, further preferably 1.30 or less. It is preferred that the optical strain value be as small as possible.

FIG. 5 is a plan view schematically showing an optical strain inspection apparatus for use in measurement of optical strain. FIG. 6 is a front view schematically showing an optical strain inspection apparatus for use in measurement of optical strain.

An optical strain inspection apparatus 41 is an apparatus for measuring an optical strain value of a measuring object W. The optical strain inspection apparatus includes a light source unit 42, a slit part 43, a measuring object placing part 44, a projection plane 45, an image inputting part 46, an image processing part 47, a pedestal 48, and an evaluation part 49. In FIG. 5 and FIG. 6, the measuring object W is placed on the measuring object placing part 44.

The light source unit 42 includes a light emitting part 421, an optical fiber 422, and an irradiation port 423. The irradiation light emitted by the light emitting part 421 is irradiated from the irradiation port 423 in the direction toward the slit part 43 through the optical fiber 422. Examples of the light emitting part include a halogen lamp, and the like.

The slit part 43 has a slit in the center part. The irradiation light irradiated from the light source unit 42 passes through the slit of the slit part 43 and reaches the measuring object W. Examples of the shape of the slit include a circular shape and a polygonal shape, and the like.

The irradiation light having penetrated the measuring object W is projected on the projection plane 45. The projection plane 45 can be installed while it is inclined at an angle θ relative to an optical axis A. Examples of the projection plane include white paper and the like. It is preferred that the surface of the projection plane be lusterless, and little contain unevenness.

The image inputting part 46 photographs the projection plane 45, and converts the contrast of the photographic image into a signal, and generates a gray image. Examples of the image inputting part include a CCD camera and the like.

The image processing part 47 detects a strain in the longitudinal direction and in the width direction of the measuring object W on the basis of a degree of variation in shading of the gray image. A variance of density values between pixels of the gray image is outputted.

The evaluation part 49 compares the variance calculated by the image processing part 47, and a variance of a predetermined allowable range, and evaluates the optical strain of the measuring object W.

The pedestal 48 includes a pedestal body 481 and an arm 482. The image inputting part 46 is placed on the arm 482.

The irradiation port 423, the slit part 43, the measuring object placing part 44 and the projection plane 45 are movable on the pedestal 48 in the direction of the optical axis A.

The optical strain inspection apparatus 41 is one example of the optical strain inspection apparatus that can be used in the present invention. The optical strain inspection apparatus is described, for example, in JP H7-306152 A. As the optical strain inspection apparatus, a commercially available product may be used.

In the present invention, as the measuring object W, two measuring objects, namely, the laminated glass X and the laminated glass for calibration are used. The laminated glass for calibration is obtained by arranging a monolayer interlayer film for calibration having a visible light transmittance of 88% between two sheets of clear float glass having a thickness of 2.5 mm.

The visible light transmittance of the monolayer interlayer film for calibration is measured at a wavelength of 380 nm to 780 nm by using a spectrophotometer (for example, "U-4100" available from Hitachi High-Tech Corporation) in accordance with JIS R3211:1998.

It is preferred that the laminated glass for calibration be prepared with the monolayer interlayer film for calibration in the following manner.

Two sheets of clear float glass in conformity with JIS R3202 having a thickness of 2.5 mm are prepared. The monolayer interlayer film for calibration is sandwiched between the two sheets of clear float glass to obtain a laminate, The obtained laminate is put into a rubber bag and the inside thereof is degassed for 20 minutes with a degree of vacuum of 2.6 kPa, after which the laminate in the degassed condition is transferred into an oven, and vacuum-pressed by retention at 90° C. for 30 minutes, and thus the laminate is preliminarily press-bonded. The preliminarily press-bonded laminate is subjected to press-bonding for 20 minutes under conditions of 135° C. and a pressure of 1.2 MPa in an autoclave to obtain a laminated glass for calibration having a size of 150 mm in length and 300 mm in width.

The positions of the irradiation port, the slit part, the measuring object placing part, the projection plane, and the image inputting part and the like, the shape of the slit, the angle θ between the optical axis and the projection plane and the like are adjusted such that the optical strain value in a condition that no measuring object is placed is 1.30, and the optical strain value of the laminated glass for calibration is 1.14. The condition that no measuring object is placed means the state that no object is placed on the measuring object placing part.

Using the adjusted optical strain inspection apparatus, an optical strain value of the laminated glass X is measured.

The measurement of optical strain is conducted under the conditions of an atmospheric temperature of 23° C., and a surface temperature of the two measuring objects (the laminated glass for calibration and the laminated glass X) of 25° C. The surface temperature of the measuring object can be measured, for example, by using a contact type thermometer.

Of the optical strain value at a surface temperature of 25° C. in the longitudinal direction of the measuring object, and the obtained optical strain value at a surface temperature of 25° C. in the widthwise direction of the measuring object, a smaller optical strain value is determined as an optical strain value of the measuring object.

An interlayer film according to the present invention is arranged between two sheets of clear float glass having a thickness of 2.1 mm to prepare a laminated glass Y having a size of 950 mm in length and 1500 mm in width.

The laminated glass Y is prepared for conducting measurement of damping ratio.

It is preferred that the laminated glass Y be prepared in the following manner.

Two sheets of clear float glass in conformity with JIS R3202 having a thickness of 2.1 mm are prepared. The interlayer film is sandwiched between the two sheets of clear float glass to obtain a laminate Y. The obtained laminate Y is put into a rubber bag and the inside thereof is degassed for 20 minutes at a degree of vacuum of 2.6 kPa, after which the laminate is transferred into an oven while being degassed, and furthermore, retained at 90° C. for 30 minutes and pressed under vacuum, and thus the laminate Y is preliminary press-bonded. The preliminarily press-bonded laminate Y is subjected to press-bonding for 20 minutes under conditions of 135° C. and a pressure of 1.2 MPa in an autoclave to obtain a laminated glass Y having a size of 950 mm in length and 1500 mm in width.

From the viewpoint of enhancing the damping performance of laminated glass, in the interlayer film according to the present invention, a damping ratio at a resonance frequency of 50 Hz or more and 80 Hz or less is 5.0% or more when laminated glass Y is subjected to the following "measurement of damping ratio".

In the measurement of damping ratio, an optical 3D digitizer (for example, "FP7000" available from Boulder Innovation Group, Inc.) and analysis software ("BK Connect" available from Spectris Co., Ltd.) are preferably used for dividing the first surface of the laminated glass Y into regions such that each region has a length of 5 cm or less and a width of 5 cm or less. Using the optical 3D digitizer and the analysis software, 3D geometry data of the laminated glass Y can be generated. In the directions of the obtained 3D geometry data corresponding to the longitudinal direction and the widthwise direction of the laminated glass Y, the first surface of the laminated glass Y can be easily divided into regions such that each region has a length of 5 cm or less and a width of 5 cm or less.

The longitudinal direction and the widthwise direction in the region correspond to the longitudinal direction and the widthwise direction of the laminated glass Y.

A plurality of the regions (the region having a length of 5 cm or less and a width of 5 cm or less) are obtained on the first surface of the laminated glass Y. Since the laminated glass Y has a size of 950 mm in length and 1500 mm in width, 570 regions are obtained when the laminated glass Y is divided such that each region has a length of 5 cm and a width of 5 cm.

On the first surface of the laminated glass, a longitudinal length of the laminated glass Y is given as $L_1$, a widthwise length is given as $L_2$, and one vertex among four vertexes of the first surface is given as vertex O. In the first surface of the laminated glass Y, an accelerometer is installed at three positions: a position of $0.3L_1$ in the longitudinal direction and $0.3L_2$ in the widthwise direction from the vertex O, a position of $0.7L_1$ in the longitudinal direction and $0.5L_2$ in the widthwise direction from the vertex O, and a position of $0.6L_1$ in the longitudinal direction and $0.8L_2$ in the widthwise direction from the vertex O. Examples of the accelerometer include "352C68" available from PCB Piezotronics, Inc. and the like.

Since the laminated glass Y has a size of 950 mm in length and 1500 mm in width, the $L_1$ is 950 mm and the $L_2$ is 1500 mm. Therefore, in the laminated glass Y, the accelerometer is installed at three positions: a position of 285 mm in the longitudinal direction and 450 mm in the widthwise direction from the vertex O, a position of 665 mm in the longitudinal direction and 750 mm in the widthwise direction from the vertex O, and a position of 570 mm and 1200 mm in the widthwise direction from the vertex O.

The laminated glass Y on which the accelerometers are installed is brought into a Free-Free condition. As a method for bringing into a Free-Free condition, a method of suspending the laminated glass Y on which the accelerometers are installed with soft rubber, or a method of placing the laminated glass Y on soft cushion, and the like can be recited.

In each of the above regions, a middle position in the longitudinal direction and a middle position in the widthwise direction of the divided region in the first surface of the laminated glass is exited with an impact hammer, and a transfer function (response (m/s$^2$) to excitation (F)) is calculated. It is preferred that the measurement of damping ratio be conducted by experimental modal analysis.

The obtained transfer function is curve-fitted with Polynominal-Z approach, and a damping ratio Y (%) at each resonance frequency X (Hz) is calculated. In the interlayer film according to the present invention, the formula: Y≥5.0 (provided that 50≤X≤80) is satisfied.

Examples of the method for controlling the optical strain value to fall within a preferred range, and the method for satisfying the damping ratio include the following methods. (1) By decreasing the molecular weight distribution ratio (weight average molecular weight/number average molecular weight) of the resin contained in the first layer of the interlayer film, the optical strain value decreases, and the damping ratio becomes easier to be satisfied. (2) By adjusting the glass transition temperature of the resin itself contained in the first layer of the interlayer film, it is possible to adjust the optical strain value. (3) By adjusting tan δ at the glass transition temperature of the first layer of the interlayer film, it is possible to adjust the optical strain value. (4) When the interlayer film has a two or more-layer structure, the optical strain value decreases by decreasing the difference in refractive index between layers. (5) As the surface roughness of the interlayer film and a layer constituting the interlayer film decreases, the optical strain value decreases. (6) When the interlayer film has a two or more-layer structure, the optical strain value decreases as the interface roughness between layers decreases. By appropriately combining these methods, it is possible to control the optical strain value to fall within a preferred range, and it is possible to satisfy the damping ratio.

Tan δ at the glass transition temperature of the first layer is preferably 1.2 or more, more preferably 1.5 or more, further preferably 2.0 or more, especially preferably 2.3 or more. When tan δ at the glass transition temperature of the first layer is the above lower limit or more and the above upper limit or less, it is possible to suppress the generation of an optical strain in laminated glass more effectively.

Tan δ at 200° C. of the first layer is preferably 0.5 or more, more preferably 0.6 or more, further preferably 0.7 or more, especially preferably 0.8 or more. When tan δ at 200° C. of the first layer is the above lower limit or more, the surface roughness of the first layer decreases, and it is possible to suppress the generation of an optical strain in laminated glass more effectively.

The glass transition temperature and tan δ of the first layer are measured in the following manner.

Regarding the interlayer film having a monolayer structure (interlayer film including only the first layer), after storing the interlayer film at a temperature of 23° C. and a humidity of 30% for 1 month or more, a measuring object (first layer) having press-molded with a press molder is subjected to measurement using "ARES-G2" available from TA Instruments. Regarding the interlayer film having a multi-layered structure, after storing the interlayer film at a temperature of 23° C. and a humidity of 30% for 1 month or more, the first layer is isolated by delaminating a plurality of layers, and a measuring object (first layer) having press-molded with a press molder is subjected to measurement using "ARES-G2" available from TA Instruments. A parallel plate with a diameter of 8 mm is used as a jig, and the measurement is performed under the condition in which the temperature is decreased from 100° C. to −50° C. at a temperature decreasing rate of 3° C./minute and under the condition of a frequency of 1 Hz and a strain of 1%. In the obtained measurement results, the peak temperature of loss tangent is defined as glass transition temperature Tg (° C.), and the value of loss tangent at the glass transition temperature is defined as tan δ at the glass transition temperature. A tan δ value at a frequency of 0.1 rad/s swept from 100 rad/s, at a measurement temperature of 200° C., a strain of 8%, in a frequency range of 100 rad/s to 0.1 rad/s is defined as tan δ at 200° C.

The refractive index of the first layer is preferably 1.470 or more, more preferably 1.475 or more, further preferably 1.480 or more, and is preferably 1.510 or less, more preferably 1.505 or less, further preferably 1.500 or less. When the refractive index of the first layer is the above lower limit or more and the above upper limit or less, it is possible to suppress the generation of an optical strain in laminated glass more effectively.

The refractive index of the second layer is preferably 1.460 or more, more preferably 1.465 or more, further preferably 1.470 or more, and is preferably 1.500 or less, more preferably 1.495 or less, further preferably 1.490 or less. When the refractive index of the second layer is the above lower limit or more and the above upper limit or less, it is possible to suppress the generation of an optical strain in laminated glass more effectively.

The refractive index of the third layer is preferably 1.460 or more, more preferably 1.465 or more, further preferably 1.470 or more, and is preferably 1.500 or less, more preferably 1.495 or less, further preferably 1.490 or less. When the refractive index of the third layer is the above lower limit or more and the above upper limit or less, it is possible to suppress the generation of an optical strain in laminated glass more effectively.

The refractive index of the first layer may be larger than or may be smaller than the refractive index of the second layer. The refractive index of the first layer may be larger than or may be smaller than the refractive index of the third layer.

An absolute value of difference between the refractive index of the first layer and the refractive index of the second layer is preferably 0.04 or less, more preferably 0.03 or less, further preferably 0.02 or less, especially preferably 0.01 or less. When the absolute value of difference is the above lower limit or more and the above upper limit or less, it is possible to suppress the generation of an optical strain in laminated glass more effectively.

An absolute value of difference between the refractive index of the first layer and the refractive index of the third layer is preferably. 0.04 or less, more preferably 0.03 or less, further preferably 0.02 or less, especially preferably 0.01 or less. When the absolute value of difference is the above lower limit or more and the above upper limit or less, it is possible to suppress the generation of an optical strain in laminated glass more effectively.

Refractive indexes of the first layer, the second layer and the third layer are measured in the following manner.

Regarding an interlayer film having a monolayer structure (interlayer film including only the first layer), after storing the interlayer film at a temperature of 23° C., and a humidity of 30% for 1 month or more, measurement is conducted using a measurement device, digital Abbe's refractometer (for example, "DR-A1" available from ATAGO CO., LTD.). Regarding an interlayer film having a multilayer structure, after storing the interlayer film at a temperature of 23° C., and a humidity of 30% for 1 month or more, the plurality of layers are delaminated to isolate the first layer, the second layer and the third layer, and measurement is conducted using a measurement device, digital Abbe's refractometer (for example, "DR-A1" available from ATAGO CO., LTD.).

Hereinafter, specific embodiments of the present invention will be described with reference to the drawings.

FIG. 1 is a sectional view schematically showing an interlayer film for laminated glass in accordance with a first embodiment of the present invention.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 includes a first layer 1, a second layer 2 and a third layer 3. The interlayer film 11 has a three-layer structure. The second layer 2 is arranged on a first surface 1*a* of the first layer 1 to be layered thereon. The third layer 3 is arranged on a second surface 1*b* opposite to the first surface 1*a* of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (second layer 2/first layer 1/third layer 3) in which the second layer 2, the first layer 1, and the third layer 3 are layered in this order.

In this connection, other layers may be arranged on the surface opposite to the first layer 1 of the second layer 2, and on the surface opposite to the first layer 1 of the third layer 3, respectively.

FIG. 2 is a sectional view schematically showing an interlayer film for laminated glass in accordance with a second embodiment of the present invention.

An interlayer film 11A shown in FIG. 2 is a single-layered interlayer film having a one-layer structure. The interlayer film 11A is a first layer. The interlayer film 11A is used for obtaining laminated glass. The interlayer film 11A is an interlayer film for laminated glass.

Hereinafter, the details of the interlayer film according to the present invention, the first layer, the second layer and the third layer, and each ingredient used in the interlayer film will be described.

(Resin)

The interlayer film contains a resin (hereinafter, sometimes described as a resin (0)). The first layer contains a resin (hereinafter, sometimes described as a resin (1)). It is preferred that the second layer contain a resin (hereinafter, sometimes described as a resin (2)). It is preferred that the third layer contain a resin (hereinafter, sometimes described as a resin (3)). The resin (1), the resin (2), and the resin (3) may be the same as or different from one another. For still higher sound insulating properties, it is preferred that the resin (1) be different from the resin (2) and the resin (3). One kind of each of the resin (0), the resin (1), the resin (2) and the resin (3) may be used alone, and two or more kinds thereof may be used in combination.

Examples of the resin (0), the resin (1), the resin (2) and the resin (3) include cured resins (cured products), and thermoplastic resins, and modified resins obtained by modifying these resins and the like.

Examples of the curable resin include resins obtained by curing a photocurable compound and a moisture-curable compound. The resin may be a cured product of a photocurable compound or a moisture-curable compound. The cured product of a photocurable compound or a moisture-curable compound can be a thermoplastic resin.

The photocurable compound or the moisture-curable compound is preferably a curable compound having a (meth)acryloyl group, and is more preferably a (meth) acrylic polymer. The resin is preferably a curable compound having a (meth)acryloyl group, and is more preferably a (meth)acrylic polymer.

Examples of the thermoplastic resin include polyvinyl acetate, a polyester resin, a polyvinyl acetal resin, a vinyl acetate resin, polystyrene, an ethylene-vinyl acetate copolymer resin, an ethylene-acrylic acid copolymer resin, a polyurethane resin, an ionomer resin, a polyvinyl alcohol resin, a polyolefin resin such as aliphatic polyolefin, and a (meth)acrylic resin (polymer having a (meth)acryloyl group) and the like. The polyoxymethylene (or polyacetal) resin is included in the polyvinyl acetal resin. Thermoplastic resins other than these may be used as the resin. The thermoplastic resin may be a thermoplastic elastomer.

The thermoplastic resin means a resin that softens and exhibits plasticity when it is heated, and hardens, for example, when it is cooled to room temperature (25° C.). Among the thermoplastic resins, especially the thermoplastic elastomer means a resin that softens and exhibits plasticity when it is heated, and hardens to exhibits rubber elasticity, for example, when it is cooled to room temperature (25° C.)

The thermoplastic resins exemplified above can be a thermoplastic elastomer by adjusting the molecular structure, the polymerization degree and the like of the resin.

From the viewpoint of further enhancing the sound insulating property, the thermoplastic resin is preferably a polymer having a (meth)acryloyl group, and more preferably a (meth)acrylic polymer.

From the viewpoint of further enhancing the penetration resistance, it is preferred that the thermoplastic resin be a polyvinyl acetal resin, an ionomer resin or an ethylene-vinyl acetate copolymer resin, and it is more preferred that the thermoplastic resin be a polyvinyl acetal resin.

<(Meth)acrylic Polymer>

It is preferred that the (meth)acryl polymer be a polymer of a polymerizable composition containing a compound having a (meth)acryloyl group. The polymerizable composition contains a polymerizable component. In order to effectively prepare the (meth)acrylic polymer, the polymerizable composition may contain a photoreaction initiator. The polymerizable composition may contain an auxiliary for accelerating the reaction together with the photoreaction initiator. Representative examples of the compound having a (meth)acryloyl group include a (meth)acrylic ester and an N-substituted acrylamide having an amide group. It is preferred that the (meth)acrylic polymer be a poly(meth)acrylic ester.

It is preferred that the polymerizable component include a (meth)acrylic ester having a cyclic ether structure, a (meth)acrylic ester having an alicyclic structure, a (meth)acrylic ester having an aromatic ring, a (meth)acrylic ester having a polar group, an acyclic (meth)acrylic ester having 6 or less carbon atoms in the side chain, or an N-substituted acrylamide having an amide group. By using such a preferred (meth)acrylic ester or N-substituted acrylamide having an amide group, the effect of the present invention can be obtained effectively, and both of the sound insulating property and the ability to prevent foaming can be enhanced in good balance.

Examples of the (meth)acrylic ester having a cyclic ether structure include glycidyl (meth)acrylate, 2-hydroxyethyl (meth)acrylate glycidyl ether, 3-hydroxypropyl (meth)acrylate glycidyl ether, 4-hydroxybutyl acrylate glycidyl ether, 5-hydroxypentyl (meth)acrylate glycidyl, 6-hydroxyhexyl (meth)acrylate glycidyl ether; (3-methyloxetane-3-yl) methyl (meth)acrylate, (3-propyloxetane-3-yl)methyl (meth)acrylate, (3-ethyloxetane-3-yl)methyl (meth)acrylate, (3-butyloxetane-3-yl)methyl (meth)acrylate, (3-ethyloxetane-3-yl)ethyl (meth)acrylate, (3-ethyloxetane-3-yl)propyl (meth)acrylate, (3-ethyloxetane-3-yl)butyl (meth)acrylate, (3-ethyloxetane-3-yl)pentyl (meth)acrylate, (3-ethyloxetane-3-yl)hexyl (meth)acrylate; tetrahydrofurfuryl (meth)acrylate, (2,2-dimethyl-1,3-dioxolanedioxolane-4-yl)methyl (meth)acrylate, (2-methyl-2-ethyl-1,3-dioxolane-4-yl)methyl (meth)acrylate, (2-methyl-2-isobutyl-1,3-dioxolane-4-yl)methyl (meth)acrylate, (2-cyclohexyl-1,3-dioxolane-4-yl)methyl (meth)acrylate, tetrahydrofurfuryl alcohol acrylic acid multimer ester; tetrahydro-2H-pyran-2-yl-(meth)acrylate, 2-{1-[(tetrahydro-2H-pyran-2-yl)oxy]-2-methylpropyl}(meth)acrylate, cyclic trimethylol propane formal acrylate, (meth)acryloyl morpholine and the like. From the viewpoint of effectively obtaining the effect of the present invention, it is preferred that the (meth)acrylic ester having a cyclic ether structure be tetrahydrofurfuryl (meth)acrylate, or cyclic trimethylol propane formal acrylate.

Examples of the (meth)acrylic ester having an alicyclic structure include isobornyl (meth)acrylate, cyclohexyl (meth)acrylate, and the like.

Examples of the (meth)acrylic ester having an aromatic ring include benzyl acrylate, phenoxypolyethyleneglycol acrylate and the like.

Examples of the (meth)acrylic ester having a polar group include (meth)acrylic esters having a hydroxyl group, an amide group, an amino group, an isocyanate group, a carboxyl group or the like as the polar group.

Examples of the (meth)acrylic ester having a hydroxyl group include 2-hydroxyethyl (meth)acrylate, hydroxypropyl (meth)acrylate, 4-hydroxybutyl (meth)acrylate, 2-hydroxybutyl (meth)acrylate and the like.

Examples of the (meth)acrylic ester having an isocyanate group include triallylisocyanurate, and derivatives thereof and the like.

Examples of the (meth)acrylic ester having a carboxyl group include acrylic acid, ω-carboxy-polycaprolactone monoacrylate, 2-acryloyloxyethylsuccinic acid.

The above-described (meth)acrylic ester may be a polycarboxylic ester having a (meth)acryloyl group. Examples of the polycarboxylic ester having a (meth)acryloyl group include 2-acryloyloxyethyl succinate and the like.

Examples of the acyclic (meth)acrylic ester having 6 or less carbon atoms in the side chain include methyl (meth)acrylate, ethyl (meth)acrylate, propyl (meth)acrylate, butyl (meth)acrylate and the like.

For effectively obtaining the effect of the present invention, it is preferred that the content of the acyclic (meth)acrylic ester having 8 or more carbon atoms in the side chain in 100% by weight of the polymerizable component be less than 20% by weight.

Examples of the N-substituted acrylamide having an amide group include N,N-dimethylaminopropyl (meth)acrylamide, N,N-dimethyl (meth)acrylamide, (meth)acryloyl morpholine, N-isopropyl (meth)acrylamide, N-hydroxyethyl (meth)acrylamide and the like.

From the viewpoint of effectively obtaining the effect of the present invention, a content of the N-substituted acrylamide having an amide group in 100% by weight of the polymerizable component is preferably less than 35% by weight. In 100% by weight of the polymerizable component, when the content of the N-substituted acrylamide having an amide group is 10% by weight or more, the impact resistance at low temperature (for example, −20° C.) is further enhanced.

Examples of the (meth)acrylic ester include besides the compounds as recited above, diethyleneglycol monoethylether (meth)acrylate, 3-methoxybutyl (meth)acrylate, 2-acryloyloxyethyl-2-hydroxypropylphthalate, 2-acryloyloxyethyl-2-hydroxylpropylphthalate, cyclohexyl (meth)acrylate; ethylene glycol di(meth)acrylate, diethylene glycol di(meth)acrylate, tetraethylene glycol di(meth)acrylate, 1,6-hexane diol di(meth)acrylate, 1,9-nonane diol di(meth)acrylate, polytetramethylene glycol di(meth)acrylate, neopentyl glycol di(meth)acrylate, 1,3-butylene glycol di(meth)acrylate, 2,2-bis[4-(acryloxyethoxy)phenyl]propane di(meth)acrylate; trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, tri(2-acryloyloxyethyl)phosphate, tetramethylol methane tri(meth)acrylate, tetramethylol propane tetra(meth)acrylate, derivatives thereof and the like.

As to each of the (meth)acrylic ester and the N-substituted acrylamide having an amide group, one kind thereof may be used alone, and two or more kinds thereof may be used in combination. The (meth)acrylic polymer may be a homopolymer of the (meth)acrylic ester, or may be a copolymer of a polymerizable component containing the (meth)acrylic ester.

Concrete examples of the photoreaction initiator include 2-methyl-1-(4-methylthiophenyl)-2-morpholinopropane-1-one, 2-benzyl-2-dimethylamino-1-(4-morpholinophenyl)-butanone-1, 2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, bis(η5-2,4-cyclopentadiene-1-yl)-bis(2,6-difluoro-3-(1H-pyrrole-1-yl)-phenyl)titanium, 2-methyl-1-(4-methylthiophenyl)-2-morpholinopropane-1-one, 2-benzyl-2-dimethylamino-1-(4-morpholinophenyl)-butanone-1, 2-(dimethylamino)-2-[(4-methylphenyl)methyl]-1-[4-(4-morpholinyl)phenyl]-1-butanone, diethoxyacetophenone, 2-hydroxy-2-methyl-1-phenylpropane-1-one, benzyldimethylketal, 4-(2-hydroxyethoxy)phenyl-(2-hydroxy-2-propyl)ketone, 1-hydroxycyclohexylphenylketone, 2-methyl-2-morpholino(4-thiomethylphenyl)propane-1-one, 2-benzyl-2-dimethylamino-1-(4-morpholinophenyl)butanone, 2-hydroxy-2-methyl-1-[4-(1-methylvinyl)phenyl]propanone oligomer, benzoin, benzoin methyl ether, benzoin ethyl ether, benzoin isopropyl ether, benzoin isobutyl ether, benzophenone, methyl o-benzoylbenzoate, 4-phenylbenzophenone, 4-benzoyl-4'-methyl-diphenylsulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy) ethyl]benzene methanaminium bromide, (4-benzoylbenzyl) trimethylammonium chloride, 2-isopropylthioxanthone, 4-isopropylthioxanthone, 2,4-diethylthioxanthone, 2,4-dichlorothioxanthone, 1-chloro-4-propoxythioxanthone, 2-(3-dimethylamino-2-hydroxy)-3,4-dimethyl-9H-thioxanthone-9-one methochloride, 2,4,6-trimethylbenzoyl-diphenylphosphine oxide, bis(2,6-dimethoxybenzoyl)-2,4,4-trimethyl-pentylphosphine oxide, bis(2,4,6-trimethylbenzoyl)-phenylphosphine oxide, triphenylmethylium tetrakis(pentafluorophenyl) borate and the like. Only one kind of the photoreaction initiator may be used, and two or more kinds thereof may be used in combination.

It is preferred that the photoreaction initiator be benzyldimethylketal, 1-hydroxycyclohexylphenylketone, or bis(2,4, 6-trimethylbenzoyl)phenylphosphine oxide.

In 100% by weight of the polymerizable composition, the content of the photoreaction initiator is preferably 0.01% by weight or more, more preferably 0.1% by weight or more and is preferably 10% by weight or less, more preferably 5% by weight or less. When the content of the photoreaction initiator is the above lower limit or more and the above upper limit or less, the photoreactivity and the storage stability increase.

When the polymerizable composition contains a photocurable compound, it is preferred to use a photocuring device such as ultraviolet irradiation equipment so as to polymerize the photocurable compound. Examples of the ultraviolet irradiation device include a box-type device, and a belt-conveyer-type device, and the like. Examples of the ultraviolet lamp installed in the ultraviolet irradiation device include a superhigh-pressure mercury lamp, a high-pressure mercury lamp, a low-pressure mercury lamp, a chemical lamp, a metal halide lamp, an excimer lamp, and a UV-LED and the like. The ultraviolet lamp is preferably a chemical lamp or a UV-LED.

When the photocurable compound is irradiated with ultraviolet rays, the ultraviolet dose (cumulative dose) is preferably 500 mJ or more, more preferably 1000 mJ or more, further preferably 1500 mJ or more, and especially preferably 2000 mJ or more. The ultraviolet dose (cumulative dose) is preferably 20000 mJ or less, more preferably 10000 mJ or less, and further preferably 8000 mJ or less. When the ultraviolet dose (cumulative dose) is the above lower limit or more, it is possible to reduce the unreacted monomers. When the ultraviolet dose (cumulative dose) is the above upper limit or less, the storage stability increases. The irradiation intensity of the ultraviolet irradiation is preferably 0.1 mW or more, more preferably 0.5 mW or more, further preferably 1 mW or more, and especially preferably 2 mW or more.

<Polyvinyl Acetate>

It is preferred that the polyvinyl acetate be a polymer of a polymerizable composition containing vinyl acetate and a monomer having the functional group because excellent effect of the present invention is achieved.

Examples of the monomer having the functional group include 3-methyl-3-buten-1-ol, ethylene glycol monovinyl ether, isopropylacrylamide and the like.

From the viewpoint of effectively enhancing the sound insulating property, the weight average molecular weight of the polyvinyl acetate is preferably 250000 or more, more preferably 300000 or more, further preferably 400000 or more, especially preferably 500000 or more. From the viewpoint of enhancing the interlayer adhesive strength, the weight average molecular weight of the polyvinyl acetate is preferably 1200000 or less, more preferably 900000 or less.

The weight average molecular weight refers to a weight average molecular weight, calculated on the polystyrene equivalent basis, measured by gel permeation chromatography (GPC).

The method for polymerizing the polymerizable composition to synthesize the polyvinyl acetate is not particularly limited. Examples of the synthesizing method include solution polymerization, suspension polymerization, and UV polymerization and the like.

From the viewpoint of increasing the transparency of the interlayer film, and effectively enhancing the sound insulating property and the interlayer adhesive strength in the interlayer film having increased transparency, the synthesizing method of the polyvinyl acetate is preferably solution polymerization.

<Polyester Resin>

Examples of the polyester resin include polyethylene terephthalate and polyethylene naphthalate, and the like.

<Polyvinyl Acetal Resin>

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, still more preferably 1500 or more, further preferably 1600 or more, and is preferably 5000 or less, more preferably 4000 or less, further preferably 3500 or less, especially preferably 3000 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, and benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin is preferably 15% by mole or more, more preferably 18% by mole or more, and preferably 40% by mole or less, and more preferably 35% by mole or less. When the content of the hydroxyl group is the above lower limit or more, the adhesive strength of the interlayer film is further enhanced. Moreover, when the content of the hydroxyl group is the above upper limit or less, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree of the polyvinyl acetal resin is preferably 0.01% by mole or more, more preferably 0.5% by mole or more, and preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (the butyralization degree in the case of a polyvinyl butyral resin) is preferably 55% by mole or more, more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further enhancing the effect of the present invention, it is preferred that the resin (1) be the (meth)acrylic polymer or the polyvinyl acetal resin, and it is more preferred that the resin (1) be the (meth)acrylic polymer.

From the viewpoint of further enhancing the effect of the present invention, and from the viewpoint of further enhancing the transparency and the sound insulating property of laminated glass, it is preferred that each of the resin (2) and the resin (3) contain the thermoplastic resin, and it is more preferred that each of each of the resin (2) and the resin (3) be the thermoplastic resin.

From the viewpoint of further enhancing the effect of the present invention, and from the viewpoint of further enhancing the transparency and the sound insulating property of laminated glass, it is preferred that the resin (2) be the polyvinyl acetal resin, and the resin (3) be the polyvinyl acetal resin.

From the viewpoint of further enhancing the production efficiency of the interlayer film, it is preferred that the resin (2) and the resin (3) be the same resin.

A molecular weight distribution ratio of weight average molecular weight to number average molecular weight (weight average molecular weight/number average molecular weight) of the resin (1) is preferably 8 or less, more preferably 6 or less, further preferably 5 or less, especially preferably 4 or less. When the molecular weight distribution ratio (weight average molecular weight/number average molecular weight) is the above upper limit or less, the melting viscosity at the time of melt molding stabilizes and the film thickness and rough surface are ameliorated, so that it is possible to suppress the generation of an optical strain in laminated glass more effectively, and it is possible to further enhance the damping performance of laminated glass. As a method of controlling the molecular weight distribution ratio (weight average molecular weight/number average molecular weight) of the resin (1) to the above upper limit or less, the following methods can be recited. When the resin is a (meth)acrylic polymer, for example, a method of favorably polymerizing the polymerizable composition at a specific wavelength, a method of polymerizing the polymerizable composition containing a light absorber that absorbs a specific wavelength, a method of polymerizing in a thickness of 1 mm or less, and a method of polymerizing using a member such as soda glass having a function of cutting a specific wavelength can be recited.

When the resin (1) is the (meth)acrylic polymer, the weight average molecular weight of the (meth)acrylic polymer is preferably 500000 or more, more preferably 700000 or more, further preferably 850000 or more, and is preferably 1900000 or less, more preferably 1400000 or less, further preferably 1100000 or less. When the weight average molecular weight of the (meth)acrylic polymer is the above lower limit or more and the above upper limit or less, it is possible to obtain the effect of the present invention more effectively, and it is possible to effectively prevent occurrence of foaming in laminated glass prepared with the interlayer film according to the present invention.

The weight average molecular weight and the number average molecular weight refer to a weight average molecular weight and a number average molecular weight calculated on the standard sample equivalent basis, measured by gel permeation chromatography (GPC). Examples of the standard sample include polystyrene, polymethyl methacrylate, and polyethylene glycol, and the like. For example, in order to determine a weight average molecular weight and a number average molecular weight on the polystyrene equivalent basis, GPC measurement for a polystyrene standard sample having a known molecular weight is conducted.

When the polystyrene standard sample is used as the standard sample, nine samples having the following weight average molecular weights are used as the polystyrene standard sample ("Shodex Standard SM-105" available from SHOWA DENKO K.K.). Standard sample No. (weight average molecular weight) of each sample: S-1.3(1270), S-3.2(3180), S-6.9(6,940), S-22(21,800), S-53(52,500), S-333(333,000), S-609(609,000), S-1345(1,350,000), S-2704(2,700,000).

An approximate line obtained by plotting molecular weight with respect to elution time of a peak top of each standard sample is used as a calibration curve. The weight average molecular weight and the number average molecular weight may be determined by dissolving the resin in tetrahydrofuran (THF) to prepare a solution of 0.2% by weight, and analyzing the solution with a GPC apparatus using tetrahydrofuran (THF) as an eluent. The weight average molecular weight and the number average molecular weight may be determined by dissolving the cured product in tetrahydrofuran (THF) to prepare a solution of 0.2% by weight, and analyzing the solution with a GPC apparatus using tetrahydrofuran (THF) as an eluent. The weight average molecular weight and the number average molecular weight may be determined by dissolving the first layer of the interlayer film (first layer obtained by peeling off the first layer when the interlayer film is a multilayer interlayer film) in tetrahydrofuran (THF) to prepare a solution of 0.2% by weight, and analyzing the solution with a GPC apparatus using tetrahydrofuran (THF) as an eluent. When the resin, the cured product or the first layer contains a compound having an amide group, the solution of 0.2% by weight may be prepared by dissolving in dimethylformamide or N-methylpyrrolidone in place of tetrahydrofuran (THF). In this case, as an eluent, dimethylformamide containing 10 mM lithium bromide or N-methylpyrrolidone containing 10 mM lithium bromide may be used. When the interlayer film is used, it is preferred to prepare the solution after leaving the interlayer film to stand in a constant temperature and humidity room (humidity 30% (±3%), temperature 23° C.) for one month. The weight average molecular weight and the number average molecular weight can be analyzed by using the following GPC apparatus as a GPC apparatus.

GPC apparatus (available from Waters, RI: 2414, autosampler alliance: e2695, guard column: KF-G, column: two serially arranged Shodex KF806L).

The resin (1) has a glass transition temperature of preferably 40° C., more preferably 45° C. or more, further preferably 50° C. or more, especially preferably 55° C. or more, and is preferably 100° C. or less, more preferably 90° C. or less, further preferably 80° C. or less. When the glass transition temperature of the resin (1) is the above lower limit or more and the above upper limit or less, it is possible to suppress the generation of an optical strain in laminated glass more effectively.

In 100% by weight of the first layer, the content of the resin (1) is preferably 10% by weight or more, more preferably 30% by weight or more, still more preferably 50% by weight or more, further preferably 60% by weight or more, especially preferably 65% by weight or more.

In 100% by weight of the resin contained in the second layer (in 100% by weight of the resin (2)), the content of the thermoplastic resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the resin (2) be the thermoplastic resin.

In 100% by weight of the thermoplastic resin contained in the second layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the thermoplastic resin of the second layer be a polyvinyl acetal resin.

In 100% by weight of the resin contained in the third layer (in 100% by weight of the resin (3)), the content of the thermoplastic resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the resin (3) be the thermoplastic resin.

In 100% by weight of the thermoplastic resin contained in the third layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the thermoplastic resin of the third layer be a polyvinyl acetal resin.

(Plasticizer)

It is preferred that the interlayer film contain a plasticizer. It is preferred that the first layer (including a single-layered interlayer film) contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By the use of the plasticizer or by using a polyvinyl acetal resin and a plasticizer together, the impact resistance and the penetration resistance are further improved, and the adhesive strength of a layer containing the polyvinyl acetal resin and the plasticizer to a lamination glass member or another layer is moderately increased. The plasticizer is not particularly limited. The plasticizer (1), the plasticizer (2) and the plasticizer (3) may be the same as or different from one another. One kind of each of the plasticizer (1), the plasticizer (2) and the plasticizer (3) may be used alone, and two or more kinds thereof may be used in combination.

Examples of the plasticizer include organic ester plasticizers such as a monobasic organic acid ester and a polybasic organic acid ester, and organic phosphate plasticizers such as an organic phosphate plasticizer and an organic phosphite plasticizer, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, and tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, and decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, and azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, and a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemicical 1]

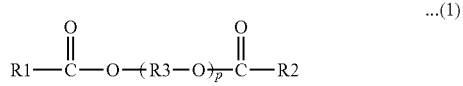

...(1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate or triethylene glycol di-2-ethylbutyrate, and it is further preferred that the plasticizer include triethylene glycol di-2-ethylhexanoate.

In the first layer, the content of the plasticizer (1) per 100 parts by weight of the resin (1) is referred to as content (1). The content (1) is preferably 10 parts by weight or more, more preferably 20 parts by weight or more, further preferably 30 parts by weight or more, especially preferably 35 parts by weight or more, and is preferably 100 parts by weight or less, more preferably 80 parts by weight or less, further preferably 70 parts by weight or less, especially preferably 65 parts by weight or less. When the content (1) is the above lower limit or more, it is possible to prevent delamination of the interlayer film more effectively, and it is possible to further enhance the sound insulating property of laminated glass. When the content (1) is the above upper limit or less, the penetration resistance of laminated glass is further enhanced.

In the second layer, the content of the plasticizer (2) per 100 parts by weight of the resin (2) is referred to as content (2). The content (2) is preferably 20 parts by weight or more, more preferably 25 parts by weight or more, further preferably 30 parts by weight or more, and is preferably 45 parts by weight or less, more preferably 40 parts by weight or less, further preferably 37 parts by weight or less. When the content (2) is the above lower limit or more, it is possible to prevent delamination of the interlayer film more effectively, and it is possible to further enhance the sound insulating property of laminated glass. When the content (2) is the above upper limit or less, the penetration resistance of laminated glass is further enhanced. When the content (2) is the above upper limit or less, the flexural rigidity is further enhanced.

In the third layer, the content of the plasticizer (3) per 100 parts by weight of the resin (3) is referred to as content (3). The content (3) is preferably 20 parts by weight or more, more preferably 25 parts by weight or more, further preferably 30 parts by weight or more, and is preferably 45 parts by weight or less, more preferably 40 parts by weight or less, further preferably 37 parts by weight or less. When the content (3) is the above lower limit or more, it is possible to prevent delamination of the interlayer film more effectively, and it is possible to further enhance the sound insulating property of laminated glass. When the content (3) is the above upper limit or less, the penetration resistance of laminated glass is further enhanced. When the content (3) is the above upper limit or less, the flexural rigidity is further enhanced.

The content (1) and the content (2) may be the same or different from each other. The content (1) and the content (3) may be the same or different from each other. From the viewpoint of enhancing the sound insulating property of laminated glass, it is preferred that the content (1) and the content (2) be the same, or the content (1) be larger than the content (2), and it is more preferred that the content (1) be larger than the content (2). From the viewpoint of enhancing the sound insulating property of laminated glass, it is preferred that the content (1) and the content (3) be the same, or the content (1) be larger than the content (3), and it is more preferred that the content (1) be larger than the content (3).

From the viewpoint of further enhancing the sound insulating property of laminated glass, each of the absolute value of difference between the content (2) and the content (1) and the absolute value of difference between the content (3) and the content (1) is preferably 5 parts by weight or more, more preferably 10 parts by weight or more, and further preferably 15 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Heat Shielding Substance)

The interlayer film may contain a heat shielding substance. The first layer may contain a heat shielding substance. The second layer may contain a heat shielding substance. The third layer may contain a heat shielding substance. One kind of the heat shielding substance may be used alone, and two or more kinds thereof may be used in combination.

The heat shielding substance may contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

The Ingredient X is not particularly limited. Examples of the Ingredient X that can be used include a phthalocyanine compound, a naphthalocyanine compound and an anthracyanine compound that are conventionally known.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

The Ingredient X may contain a vanadium atom or a copper atom. The Ingredient X may contain a vanadium atom, and may contain a copper atom. The Ingredient X may be at least one kind of phthalocyanines containing a vanadium atom or a copper atom, and derivatives of phthalocyanine containing a vanadium atom or a copper atom.

The interlayer film may contain heat shielding particles. The first layer may contain heat shielding particles. The second layer may contain heat shielding particles. The third layer may contain heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

As the heat shielding particles, metal oxide particles may be used. As the heat shielding particles, particles formed of an oxide of metal (metal oxide particles) may be used.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used.

(Metal Salt)

The interlayer film may contain at least one kind of metal salt (hereinafter, sometimes described as Metal salt M) among an alkali metal salt and an alkaline earth metal salt. The alkali earth metal means six metals of Be, Mg, Ca, Sr, Ba, and Ra. The first layer may contain the metal salt M. The second layer may contain the metal salt M. The third layer may contain the Metal salt M. By the use of the Metal salt M, controlling the adhesivity between the interlayer film and a lamination glass member such as a glass plate or the adhesivity between respective layers in the interlayer film is facilitated. One kind of the metal salt M may be used alone, and two or more kinds thereof may be used in combination.

The metal salt M may contain at least one kind of metal selected from the group consisting of Li, Na, K, Rb, Cs, Mg, Ca, Sr and Ba.

As the metal salt M, an alkali metal salt of an organic acid having 2 to 16 carbon atoms, and an alkali earth metal salt of an organic acid having 2 to 16 carbon atoms can be used. The metal salt M may include a magnesium salt of a carboxylic acid having 2 to 16 carbon atoms, or a potassium salt of a carboxylic acid having 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

(Ultraviolet Ray Screening Agent)

The interlayer film may contain an ultraviolet ray screening agent. The first layer may contain an ultraviolet ray screening agent. The second layer may contain an ultraviolet ray screening agent. The third layer may contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet absorber. It is preferred that the ultraviolet ray screening agent be an ultraviolet absorber.

When the polymerizable composition containing the compound having a (meth)acryloyl group contains a photocurable compound, the ultraviolet absorber may be introduced in an amount smaller than that of the photo initiator (the amount that does not inhibit the polymerization) at the time of polymerizing the photocurable compound, or the ultraviolet absorber may be introduced in a separate step after polymerizing the photocurable compound with the photo initiator.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, and particles in which the surface of palladium particles is coated with silica, and the like. It is preferred that the ultraviolet ray screening agent not be heat shielding particles.

Examples of the ultraviolet ray screening agent containing a metal oxide include zinc oxide, titanium oxide, and cerium oxide, and the like. Furthermore, with regard to the ultraviolet ray screening agent containing a metal oxide, the surface may be coated. Examples of the coating material for the surface of the ultraviolet ray screening agent containing a metal oxide include an insulating metal oxide, a hydrolyzable organosilicon compound, and a silicone compound, and the like.

Examples of the insulating metal oxide include silica, alumina, and zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

(Oxidation Inhibitor)

The interlayer film may contain an oxidation inhibitor. The first layer may contain an oxidation inhibitor. The second layer may contain an oxidation inhibitor. The third layer may contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, and a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, and 2,2'-methylenebis(4,6-di-t-butyl-1-phenyloxy)(2-ethylhexyloxy) phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., and "IRGANOX 1010" available from BASF Japan Ltd., and the like.

(Other Ingredients)

Each of the interlayer film, the first layer, the second layer, and the third layer may contain additives such as a coupling agent, a dispersing agent, a surfactant, a flame retardant, an antistatic agent, an adhesivity adjusting agent other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film for Laminated Glass)

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film is further improved.

The thickness of the interlayer film is designated as T. The thickness of the first layer is preferably 0.005 T or more, more preferably 0.01 T or more, further preferably 0.02 T or more, and is preferably 0.17 T or less, more preferably 0.15 T or less, still more preferably 0.13 T or less, more preferably 0.1 T or less, further preferably 0.09 T or less. When the thickness is in the range from the aforementioned lower limit to the aforementioned upper limit, the sound insulating property is further enhanced in a wide range of temperature.

The thickness of each of the second layer and the third layer is 0.01 T or more, further preferably 0.1 T or more, and is preferably 0.6 T or less, more preferably 0.5 T or less, more preferably 0.45 T or less. When the thickness is in the range from the aforementioned lower limit to the aforementioned upper limit, the sound insulating property is further enhanced in a wide range of temperature.

The interlayer film may be an interlayer film having a uniform thickness, or may be an interlayer film having varying thickness. The sectional shape of the interlayer film may be a rectangular shape and may be a wedge-like shape.

The interlayer film may be wound to be formed into a roll body of the interlayer film. The roll body may include a winding core and an interlayer film wound on the outer periphery of the winding core.

The distance between one end and the other end of the interlayer film is preferably 3 m or less, more preferably 2 m or less, especially preferably 1.5 m or less, and is preferably 0.5 m or more, more preferably 0.8 m or more, especially preferably 1 m or more.

The production method of the interlayer film according to the present invention is not particularly limited. Examples of the production method of the interlayer film according to the present invention include a method of separately forming resin compositions used for constituting respective layers into respective layers, and then layering the obtained layers, a method of coextruding resin compositions used for constituting respective layers with an extruder and layering the layers, and the like. A production method of extrusion-molding is preferred because the method is suitable for continuous production.

For the reason of excellent production efficiency of the interlayer film, it is preferred that the second layer and the third layer contain the same polyvinyl acetal resin. For the reason of excellent production efficiency of the interlayer film, it is more preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calender roll method, and a profile extrusion method, and the like. The emboss roll method is preferred because a large number of embosses of the protrusions and recesses, which is a quantitatively constant protrusion and recess pattern, can be formed.

(Laminated Glass)

The laminated glass according to the present invention includes a first lamination glass member, a second lamination glass member and the aforementioned interlayer film for laminated glass. In the laminated glass according to the present invention, the above-described interlayer film for laminated glass is arranged between the first lamination glass member and the second lamination glass member.

The laminated glass according to the present invention includes a first lamination glass member, a second lamination glass member, and an interlayer film for laminated glass having a one-layer structure or a two or more-layer structure. In the laminated glass according to the present invention, the interlayer film includes a first layer containing a resin.

It is preferred that in the laminated glass according to the present invention, when the measurement of optical strain is conducted, the optical strain value be 3.00 or less.

Measurement of optical strain: an optical strain inspection apparatus including a light source unit for emitting irradiation light, a projection plane for projecting the irradiation light having passed through a measuring object, an image inputting part that photographs the projection plane to generate a gray image, and an image processing part that detects an optical strain in a longitudinal direction and in a widthwise direction of the measuring object on the basis of a degree of variation in shading of the gray image is prepared. As the measuring object, two measuring objects, namely, the laminated glass, and a laminated glass for calibration obtained by arranging a monolayer interlayer film for calibration having a visible light transmittance of 88% between two sheets of clear float glass having a thickness of 2.5 mm are prepared. An optical strain value of the laminated glass is measured by using the optical strain inspection apparatus that is adjusted such that the optical strain value in a condition that no measuring object is placed is 1.30, and an optical strain value of the laminated glass for calibration is 1.14. Measurement conditions include an atmospheric temperature of 23° C. and a surface temperature of the measuring object of 25° C. Of the obtained optical strain value in the longitudinal direction of the measuring object, and the obtained optical strain value in the widthwise direction of the measuring object, a smaller optical strain value is determined as an optical strain value of the measuring object.

It is preferred that in the laminated glass according to the present invention, when the measurement of damping ratio is conducted, the damping ratio be 5.0% or more at a resonance frequency of 50 Hz or more and 80 Hz or less.

Measurement of damping ratio: a first surface of the laminated glass is divided into regions such that each region has a length of 5 cm or less and a width of 5 cm or less. A longitudinal length of the laminated glass is given as $L_1$, a widthwise length is given as $L_2$, and one vertex of the first surface is given as vertex O. In the first surface of the laminated glass, an accelerometer is installed at three positions: a position of $0.3L_1$ in the longitudinal direction and $0.3L_2$ in the widthwise direction from the vertex O, a position of $0.7L_1$ in the longitudinal direction and $0.5L_2$ in the widthwise direction from the vertex O, and a position of $0.6L_1$ in the longitudinal direction and $0.8L_2$ in the widthwise direction from the vertex O. In each of the above regions, ae middle position in the longitudinal direction and a middle position in the widthwise direction of the region in the first surface is exited with an impact hammer, and a transfer function is calculated. According to the obtained transfer function, a damping ratio at a resonance frequency of 50 Hz or more and 80 Hz or less is calculated.

The "measurement of optical strain" of laminated glass according to the present invention is performed in the same manner as the "measurement of optical strain" of laminated glass X. Also, the "measurement of damping" of laminated glass according to the present invention is performed in the same manner as the "measurement of damping ratio" of laminated glass Y. In the "measurement of optical strain" of laminated glass according to the present invention, the size of the laminated glass may be the same or different from the size of the laminated glass X. Also, in the "measurement of damping ratio" of laminated glass according to the present invention, the size of the laminated glass may be the same or different from the size of the laminated glass Y. The laminated glass may be cut to have the same size as the laminated glass X or the laminated glass Y.

From the viewpoint of further suppressing the generation of an optical strain, the optical strain value of the laminated glass is preferably 3.0 or less, more preferably 2.5 or less, further preferably 2.0 or less, especially preferably 1.8 or less. It is preferred that the optical strain value be as small as possible.

FIG. 3 is a sectional view schematically showing an example of laminated glass prepared with the interlayer film for laminated glass shown in FIG. 1.

A laminated glass 31 shown in FIG. 3 includes a first lamination glass member 21, a second lamination glass member 22 and the interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 2a of the second layer 2. The second lamination glass member 22 is layered on an outer surface 3a of the third layer 3.

FIG. 4 is a sectional view schematically showing an example of laminated glass prepared with the interlayer film for laminated glass shown in FIG. 2.

A laminated glass 31A shown in FIG. 4 includes the first lamination glass member 21, the second lamination glass member 22 and the interlayer film 11A. The interlayer film 11A is arranged between the first lamination glass member 21 and the second lamination glass member 22 to be sandwiched therebetween.

The first lamination glass member 21 is layered on the first surface 11a of the interlayer film 11A. The second lamination glass member 22 is layered on the second surface 11b opposite to the first surface 11a of the interlayer film 11A.

As described above, the laminated glass according to the present invention includes a first lamination glass member, a second lamination glass member, and an interlayer film, and the interlayer film is the interlayer film for laminated glass according to the present invention. In the laminated glass according to the present invention, the interlayer film is arranged between the first lamination glass member and the second lamination glass member.

It is preferred that the first lamination glass member be the first glass plate. It is preferred that the second lamination glass member be the second glass plate.

Examples of the first and second lamination glass members include a glass plate, and a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate including a glass plate, and it is preferred that at least one glass plate be used. It is preferred that each of the first lamination glass member and the second lamination glass member be a glass plate or a PET film, and the laminated glass include a glass plate as at least one among the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and green glass, and the like. The organic glass is synthetic resin glass substituted for inorganic glass. Examples of the organic glass include a polycarbonate plate, and a poly(meth)acrylic resin plate, and the like. Examples of the poly(meth)acrylic resin plate include a polymethyl (meth)acrylate plate, and the like.

The thicknesses of each of the first lamination glass member and the second lamination glass member is preferably 1 mm or more, and is preferably 5 mm or less, and more preferably 3 mm or less. Moreover, when the lamination glass member is a glass plate, the thickness of the glass plate is preferably 0.5 mm or more, more preferably 0.7 mm or more, preferably 5 mm or less and more preferably 3 mm or less. When the lamination glass member is a PET film, the thickness of the PET film is preferably 0.03 mm or more and is preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first and the second lamination glass members and the interlayer film is removed. Afterward, the members are preliminarily bonded together at about 70° C. to 110° C. to obtain a laminate. Next, by putting the laminate into an autoclave or by pressing the laminate, the members are press-bonded together at about 120° C. to 150° C. and under a pressure of 1 MPa to 1.5 MPa. In this way, laminated glass can be obtained. At the time of producing the laminated glass, layers in the interlayer film may be laminated.

Each of the interlayer film and the laminated glass can be used for automobiles, railway vehicles, aircraft, ships, and buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is suitably used for obtaining laminated glass of an automobile.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

The following materials were prepared.

(Resin)

Polyvinyl acetal resin (polyvinyl butyral resin (PVB), average polymerization degree of 3000, content of hydroxyl group of 30.3% by mole, acetylation degree of 1.0% by mole, acetalization degree (butyralization degree) of 68.7% by mole))

Synthesis of (meth)acrylic Polymer (1):

A polymerizable composition having the blending composition shown in the following Table 1 was sandwiched between two PET sheets having subjected to a mold release treatment on one side (available from Nippa Corporation, having a thickness of 50 µm) to form a polymerizable composition layer having a thickness of 1 mm. A spacer was arranged around the two PET sheets. The polymerizable composition layer was irradiated with ultraviolet rays at 3 mW in a dose of 3000 mJ/cm$^2$ with a chemical lamp to cure the polymerizable composition by reaction, and thus (meth) acrylic polymer (1) was obtained.

Synthesis of (meth)acrylic polymers (2) to (7), (X1), (X2): (Meth)acrylic polymers (2) to (7), (X1), (X2) were obtained in the same manner as that for the (meth)acrylic polymer (1) except that the blending composition of the polymerizable composition was changed as shown in Table 1.

Synthesis of (meth)acrylic polymer (X3):

(Meth)acrylic polymer (X3) was obtained in the same manner as that for the (meth)acrylic polymer (1) except that the thickness of the polymerizable composition layer was changed to 3 mm.

(Plasticizer)

Triethylene glycol di-2-ethylhexanoate (3GO)

(Metal Salt M)

Mg mixture (50:50 (weight ratio) mixture of magnesium 2-ethylbutyrate and magnesium acetate)

(Ultraviolet Ray Screening Agent)

Tinuvin 326 (2-(2'-hydroxy-3'-t-butyl-5-methylphenyl)-5-chlorobenzotriazole, "Tinuvin 326" available from BASF Japan Ltd.)

(Oxidation Inhibitor)

BHT (2,6-di-t-butyl-p-cresol)

Example 1

Preparation of Composition for Forming First Layer:

The following ingredients were mixed, and kneaded sufficiently with a mixing roll to obtain a composition for forming a first layer.

(Meth)acrylic Polymer (1) 100 Parts by Weight

Triethylene glycol di-2-ethylhexanoate (3GO): 60 parts by weight

Preparation of Composition for Forming Second Layer and Third Layer:

The following ingredients were mixed, and kneaded sufficiently with a mixing roll to obtain a composition for forming a second layer and a third layer.

Polyvinyl Acetal Resin (PVB) 100 Parts by Weight

Triethylene glycol di-2-ethylhexanoate (3GO) 30 parts by weight

Metal salt M (Mg mixture) in such an amount that is 70 ppm in the obtained second layer and third layers Ultraviolet ray screening agent (Tinuvin 326) in an amount of 0.2% by weight in the obtained second layer and third layers Oxidation inhibitor (BHT) in an amount of 0.2% by weight in the obtained second layer and third layers Preparation of Interlayer Film:

By coextruding the composition for forming a first layer and a composition for forming a second layer and a third layer using a coextruder, an interlayer film (760 µm in thickness) having a layered structure with a stack of a second layer (330 µm in thickness)/a first layer (100 µm in thickness)/a third layer (330 µm in thickness) was prepared.

Preparation of Laminated Glass for Measurement of Optical Strain:

An interlayer film was sandwiched between two sheets of clear float glass in accordance with JIS R3202 having a width of 2.5 mm to obtain a laminate. The obtained laminate was put into a rubber bag and the inside thereof was degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a laminated glass for measurement of optical strain having a size of 150 mm in length and 300 mm in width.

Preparation of Laminated Glass for Measurement of Damping Ratio:

An interlayer film was sandwiched between two sheets of clear float glass in accordance with JIS R3202 having a width of 2.1 mm to obtain a laminate. The obtained laminate was put into a rubber bag and the inside thereof was degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a laminated glass for measurement of damping ratio having a size of 950 mm in length and 1500 mm in width.

The obtained laminated glass for measurement of optical strain corresponds to the laminated glass X. The obtained laminated glass for measurement of damping ratio corresponds to the laminated glass Y.

Examples 2 to 7 and Comparative Examples 1 to 3

The interlayer film, the laminated glass for measurement of optical strain and the laminated glass for measurement of damping ratio were obtained in the same manner as that in Example 1 except that the kind of the resin and the content of the plasticizer were changed as shown in Tables 2 and 3.

(Evaluation)

(1) Molecular Weight Distribution Ratio of Resin Contained in First Layer

The obtained resin was dissolved in tetrahydrofuran (THF) to prepare a solution of 0.2% by weight, and the solution was filtered through a filter of 0.2 µm. Using this solution, a weight average molecular weight and a number average molecular weight of the resin on the polystyrene equivalent basis were measured by gel permeation chromatography (GPC) measurement in the above-described measurement condition. Also, on the basis of the obtained weight average molecular weight and number average molecular weight, a molecular weight distribution ratio (weight average molecular weight/number average molecular weight) of the resin was calculated.

(2) Glass Transition Temperature of Resin Contained in First Layer

The polymerizable composition was stored for 1 month in an environment at room temperature of 23±2° C. and a humidity of 25±5%. Directly after storage, the composition was press molded at 150° C. so that the thickness was 0.35 mm (at 150° C. without pressurization for 10 minutes, at 150° C. under pressurization for 10 minutes) to prepare a resin film. Then the resin film was measured for viscoelasticity using "ARES-G2" available from TA Instruments. Glass transition temperature was measured under the condition in which the temperature was decreased from 100° C. to −50° C. at a temperature decreasing rate of 3° C./minute and under the condition of a frequency of 1 Hz and a strain of 1% by using a parallel plate with a diameter of 8 mm as a jig.

(3) Tan δ of First Layer

After storing the obtained interlayer film at a temperature of 23° C. and a humidity of 30% for 1 month or more, the first layer was isolated by delaminating the first layer, and the second and third layers, and a measuring object (first layer) having press-molded with a press molder was subjected to measurement using "ARES-G2" available from TA Instruments. A parallel plate with a diameter of 8 mm was used as a jig, and the measurement was performed under the condition in which the temperature is decreased from 100° C. to −50° C. at a temperature decreasing rate of 3° C./minute and under the condition of a frequency of 1 Hz and a strain of 1%. In the obtained measurement results, the peak temperature of loss tangent was defined as glass transition temperature Tg (° C.), and the value of loss tangent at the glass transition temperature was defined as "tan δ at the glass transition temperature". A tan δ value at a frequency of 0.1 rad/s swept from 100 rad/s, at a measurement temperature of 200° C., a strain of 8%, in a frequency range of 100 rad/s to 0.1 rad/s was defined as "tan δ at 200° C.".

Tan δ at 200° C. was judged according to the following criteria.

[Criteria for Judgement in tan δ at 200° C.]

○: tan δ at 200° C. is 0.5 or more x: tan δ at 200° C. is less than 0.5

(4) Refractive Index

After storing the obtained interlayer film at a temperature of 23° C., and a humidity of 30% for 1 month or more, refractive indexes of the first layer, the second layer and the third layer were measured using a measurement device, digital Abbe's refractometer ("DR-A1" available from ATAGO CO., LTD.). Also, from the obtained values of refractive index, an absolute value of difference between the refractive index of the first layer and the refractive index of the second and third layers was calculated. Also, the refractive index of the resin contained in the first layer was measured. The absolute value of difference between the refractive index of the first layer, and the refractive index of the second and third layers was judged according to the following criteria.

[Criteria for Judgement in Absolute Value of Difference Between Refractive Index of First Layer, and Refractive Index of Second and Third Layers]

○○: absolute value of difference between refractive index of first layer, and refractive index of second and third layers is 0.01 or less ○: absolute value of difference between refractive index of first layer, and refractive index of second and third layers is more than 0.01 and 0.04 or less x: absolute value of difference between refractive index of first layer, and refractive index of second and third layers is more than 0.04

(5) Optical Strain (Visual Observation)

A fluorescent lamp ("FL32S.D" available from Panasonic Corporation) was placed at a point 7 m away from the observer, and the obtained laminated glass for measurement of optical strain was placed at a point 40 cm away from the observer between the observer and the fluorescent lamp. The laminated glass for measurement of optical strain was placed while it is inclined at 20° relative to the horizontal plane. The observer visually checked whether or not the fluorescent lamp looked distorted when the observer observed the fluorescent lamp through the laminated glass for measurement of optical strain.

[Criteria for Judgement in Optical Strain (Visual Observation)]

○: fluorescent lamp looks undistorted x: fluorescent lamp looks distorted (6) Optical Strain Value Using the obtained laminated glass for measurement of optical strain, an optical strain value was determined according to the above-described "measurement of optical strain". As the light source (light emitting part), a halogen lamp ("EYE DICHO-COOL HALOGEN (15 V 100 W)" available from IWASAKI ELECTRIC CO., LTD.) was used. Of the obtained optical strain value at a surface temperature of 25° C. in the longitudinal direction of the laminated glass for measurement of optical strain, and the obtained optical strain value at a surface temperature of 25° C. in the widthwise direction, a smaller value was determined as an optical strain value of the laminated glass for measurement of optical strain.

[Criteria for Judgement in Optical Strain Value]

○○: optical strain value is 1.30 or less

○: optical strain value is more than 1.30 and 1.45 or less

Δ: optical strain value is more than 1.45 and 3.00 or less x: optical strain value is more than 3.00

(7) Damping Ratio

Using the obtained laminated glass for measurement of damping ratio, a damping ratio at a resonance frequency of 50 Hz or more and 80 Hz or less was determined according to the above-described "measurement of damping ratio". The laminated glass for measurement of damping ratio on which the accelerometers were installed was brought into a Free-Free condition by suspending it with soft rubber, and the measurement was conducted. As an optical 3D digitizer, "FP7000" available from Boulder Innovation Group, Inc. was used, and as analysis software, "BK Connect" available from Spectris Co., Ltd. was used. Also, as the accelerometer, "352C68" available from PCB Piezotronics, Inc. was used. The calculated transfer function (response ($m/s^2$) to excitation (F)) was curve-fitted with Polynominal-Z approach, and a damping ratio Y (%) at each resonance frequency X (Hz) was calculated. At a resonance frequency of 50 Hz or more and 80 Hz or less, relationship between resonance frequency X (Hz) and damping ratio Y (%) was determined.

[Criteria for Judgment in Damping Ratio]

○: damping ratio Y is 5.0% or more x: damping ratio Y is less than 5.0%

When the damping ratio at a resonance frequency of 50 Hz or more and 80 Hz or less is 5.0% is more, the laminated glass is excellent in damping performance.

The details and the results are shown in the following Tables 1 to 3. In Table, the description of the Metal salt M, the ultraviolet ray screening agent and the oxidation inhibitor was omitted.

TABLE 1

| Ingredients | | (Meth)acrylic polymer (1) | (Meth)acrylic polymer (2) | (Meth)acrylic polymer (3) | (Meth)acrylic polymer (4) | (Meth)acrylic polymer (5) |
|---|---|---|---|---|---|---|
| CTFA (#200) | parts by weight | 20 | 20 | 20 | 10 | 20 |
| TBA | parts by weight | | | 5 | | |
| DMAA | parts by weight | 10 | 10 | 15 | 20 | 15 |
| BzA | parts by weight | | | | | |
| BA | parts by weight | | 10 | 10 | 10 | |
| HPA | parts by weight | | | | | |
| MEDOL-10 | parts by weight | | | | | |
| IBOA | parts by weight | 70 | 60 | 50 | 60 | 60 |
| 2EEA | parts by weight | | | | | 5 |
| IRGACURE 184 | parts by weight | 0.2 | 0.2 | 0.2 | 0.2 | 0.2 |

| Ingredients | | (Meth)acrylic polymer (6) | (Meth)acrylic polymer (7) | (Meth)acrylic polymer (X1) | (Meth)acrylic polymer (X2) | (Meth)acrylic polymer (X3) |
|---|---|---|---|---|---|---|
| CTFA (#200) | parts by weight | 25 | 13 | | 10 | 20 |
| TBA | parts by weight | | | | | |
| DMAA | parts by weight | 15 | 20 | | | 10 |
| BzA | parts by weight | | | | 5 | |
| BA | parts by weight | | | | | |
| HPA | parts by weight | | | | 15 | |
| MEDOL-10 | parts by weight | | | 100 | | |
| IBOA | parts by weight | 55 | 60 | | 70 | 70 |
| 2EEA | parts by weight | 5 | 7 | | | |
| IRGACURE 184 | parts by weight | 0.2 | 0.2 | 0.2 | 0.2 | 0.2 |

The details of the ingredients in Table 1 are as follows.
CTFA: cyclic trimethylolpropane formal acrylate (available from OSAKA ORGANIC CHEMICAL INDUSTRY LTD., VISCOAT #200)
TBA: t-butyl acrylate (available from OSAKA ORGANIC CHEMICAL INDUSTRY LTD.)
DMAA: Dimethyl acrylamide (available from KJ Chemicals Corporation)
BzA: benzyl acrylate (available from OSAKA ORGANIC CHEMICAL INDUSTRY LTD., VISCOAT #160)
BA: n-butyl acrylate (available from NIPPON SHOKUBAI CO., LTD.)
HPA: hydroxypropyl acrylate (available from OSAKA ORGANIC CHEMICAL INDUSTRY LTD.)
MEDOL-10: (2-methyl-2-ethyl-1,3-dioxolan-4-yl)methyl (meth)acrylate (available from OSAKA ORGANIC CHEMICAL INDUSTRY LTD.)
IBOA: isobornyl acrylate (available from NIPPON SHOKUBAI CO., LTD.)
2EHA: 2-ethylhexyl acrylate (available from NIPPON SHOKUBAI CO., LTD.)
IRGACURE 184: 2,2-dimethoxy-1,2-diphenylethan-1-one (available from BASF)

TABLE 2

| | | | Unit | Example 1 | Example 2 | Example 3 | Example 4 | Example 5 |
|---|---|---|---|---|---|---|---|---|
| Interlayer film | First layer | Thickness | μm | 100 | 100 | 100 | 100 | 100 |
| | | Kind of resin | — | (Meth)acrylic polymer (1) | (Meth)acrylic polymer (2) | (Meth)acrylic polymer (3) | (Meth)acrylic polymer (4) | (Meth)acrylic polymer (5) |
| | | Content of resin | parts by weight | 100 | 100 | 100 | 100 | 100 |
| | | Kind of plasticizer | — | 3GO | 3GO | 3GO | 3GO | 3GO |
| | | Content of plasticizer | parts by weight | 60 | 40 | 40 | 50 | 50 |

TABLE 2-continued

|  |  | Unit | Example 1 | Example 2 | Example 3 | Example 4 | Example 5 |
|---|---|---|---|---|---|---|---|
| Second and third layers | Each thickness | μm | 330 | 330 | 330 | 330 | 330 |
|  | Kind of resin | — | PVB | PVB | PVB | PVB | PVB |
|  | Content of resin | parts by weight | 100 | 100 | 100 | 100 | 100 |
|  | Kind of plasticizer | — | 3GO | 3GO | 3GO | 3GO | 3GO |
|  | Content of plasticizer | parts by weight | 30 | 32 | 32 | 32 | 30 |
| Resin contained in first layer | Molecular weight distribution ratio | — | 3.0 | 3.1 | 2.9 | 2.9 | 6.8 |
|  | Glass transition temperature | °C. | 69.1 | 53 | 52.6 | 71 | 64 |
|  | Refractive index | — | 1.506 | 1.503 | 1.503 | 1.501 | 1.501 |
| First layer | Tanδ at glass transition temperature | — | 2.85 | 2.93 | 2.91 | 2.05 | 2.95 |
|  | Tanδ at 200° C. | — | 0.94 | 0.85 | 0.87 | 0.7 | 0.88 |
|  |  | Judgement | ○ | ○ | ○ | ○ | ○ |
|  | Refractive index | — | −1.4880 | 1.4910 | 1.4910 | 1.4855 | 1.4855 |
| Second and third layers | Refractive index | — | 1.4800 | 1.4794 | 1.4794 | 1.4794 | 1.4800 |
| Absolute value of difference between refractive index of first layer and refractive index of second and third layers | | — | 0.0080 | 0.0116 | 0.0116 | 0.0061 | 0.0055 |
|  |  | Judgement | ○○ | ○ | ○ | ○○ | ○○ |
| Optical strain (visual observation) | | Judgement | ○ | ○ | ○ | ○ | ○ |
| Optical strain value | | — | 1.30 | 1.46 | 1.43 | 1.39 | 1.38 |
|  |  | Judgement | ○○ | Δ | ○ | ○ | ○ |
| Damping ratio | | Judgement | ○ | ○ | ○ | ○ | ○ |

TABLE 3

|  |  |  | Unit | Example 6 | Example 7 | Comparative Example 1 | Comparative Example 2 | Comparative Example 3 |
|---|---|---|---|---|---|---|---|---|
| Interlayer film | First layer | Thickness | μm | 100 | 100 | 100 | 100 | 100 |
|  |  | Kind of resin | — | (Meth)acrylic polymer (6) | (Meth)acrylic polymer (7) | (Meth)acrylic polymer (X1) | (Meth)acrylic polymer (X2) | (Meth)acrylic polymer (X3) |
|  |  | Content of resin | parts by weight | 100 | 100 | 100 | 100 | 100 |
|  |  | Kind of plasticizer | — | 3GO | 3GO | 3GO | 3GO | 3GO |
|  |  | Content of plasticizer | parts by weight | 45 | 48 | 30 | 60 | 60 |
|  | Second and third layers | Each thickness | μm | 330 | 330 | 330 | 330 | 330 |
|  |  | Kind of resin | — | PVB | PVB | PVB | PVB | PVB |
|  |  | Content of resin | parts by weight | 100 | 100 | 100 | 100 | 100 |
|  |  | Kind of plasticizer | — | 3GO | 3GO | 3GO | 3GO | 3GO |
|  |  | Content of plasticizer | parts by weight | 30 | 30 | 28 | 28 | 30 |
| Resin contained in first layer | Molecular weight distribution ratio | | — | 2.9 | 2.9 | 3.1 | 3.3 | 22.7 |
|  | Glass transition temperature | | °C. | 56 | 56 | 3.8 | 54.6 | 69.1 |
|  | Refractive index | | — | 1.502 | 1.501 | 1.484 | 1.543 | 1.506 |
| First layer | Tanδ at glass transition temperature | | — | 3.10 | 2.88 | 1.99 | 2.25 | 2.847 |
|  | Tanδ at 200° C. | | — | 0.75 | 0.84 | 0.38 | 0.40 | 0.49 |
|  |  | | Judgement | ○ | ○ | x | x | x |
|  | Refractive index | | — | 1.4908 | 1.4888 | 1.4750 | 1.5245 | 1.488 |
| Second and third layers | Refractive index | | — | 1.4800 | 1.4800 | 1.4806 | 1.4806 | 1.48 |
| Absolute value of difference between refractive index of first layer and refractive index of second and third layers | | | — | 0.0108 | 0.0088 | 0.0056 | 0.0439 | 0.008 |
|  |  | | Judgement | ○ | ○○ | ○○ | x | ○○ |
| Optical strain (visual observation) | | | Judgement | ○ | ○ | x | x | x |
| Optical strain value | | | — | 1.42 | 1.45 | 3.62 | 4.80 | 3.3 |
|  |  | | Judgement | ○ | ○ | x | x | x |
| Damping ratio | | | Judgement | ○ | ○ | x | x | ○ |

EXPLANATION OF SYMBOLS

1: First layer
1a: First surface
1b: Second surface
2: Second layer
2a: Outer surface
3: Third layer
3a: Outer surface
11: Interlayer film
11A: Interlayer film (First layer)
11a: First surface
11b: Second surface
21: First lamination glass member
22: Second lamination glass member
31, 31A: Laminated glass
41: Optical strain inspection apparatus
42: Light source unit
43: Slit part
44: Measuring object placing part
45: Projection plane
46: Image inputting part
47: Image processing part
48: Pedestal
49: Evaluation part
421: Light emitting part
422: Optical fiber
423: irradiation port
481: Pedestal body
482: Arm
A: Optical axis
W: Measuring object

The invention claimed is:

1. An interlayer film for laminated glass having a one-layer or two or more-layer structure,
the interlayer film including a first layer containing a resin,
when the interlayer film is arranged between two sheets of clear float glass having a thickness of 2.5 mm to obtain a laminated glass X with a size of 150 mm in length and 300 mm in width, and the obtained laminated glass X is subjected to measurement of optical strain, an optical strain value being 3.00 or less,
when the interlayer film is arranged between two sheets of clear float glass having a thickness of 2.1 mm to obtain a laminated glass Y having a size of 950 mm in length and 1500 mm in width, and the obtained laminated glass Y is subjected to measurement of damping ratio, a damping ratio at a resonance frequency of 50 Hz or more and 80 Hz or less being 5.0% or more:
the measurement of optical strain including:
preparing an optical strain inspection apparatus including a light source unit for emitting irradiation light, a projection plane for projecting the irradiation light having penetrated a measuring object, an image inputting part that photographs the projection plane to generate a gray image, and an image processing part that detects an optical strain in a longitudinal direction and in a widthwise direction of the measuring object on the basis of a degree of variation in shading of the gray image;
preparing as the measuring object, two measuring objects, namely, the laminated glass X, and a laminated glass for calibration obtained by arranging a monolayer interlayer film for calibration having a visible light transmittance of 88% between two sheets of clear float glass having a thickness of 2.5 mm;
measuring an optical strain value of the laminated glass X by using the optical strain inspection apparatus that is adjusted such that the optical strain value in a condition that no measuring object is placed is 1.30, and an optical strain value of the laminated glass for calibration is 1.14;
measurement conditions including an atmospheric temperature of 23° C. and a surface temperature of the measuring object of 25° C.; and
of the obtained optical strain value in the longitudinal direction of the measuring object, and the obtained optical strain value in the widthwise direction of the measuring object, a smaller optical strain value being determined as an optical strain value of the measuring object,
the measurement of damping ratio including:
dividing a first surface of the laminated glass Y into regions such that each region has a length of 5 cm or less and a width of 5 cm or less;
when a longitudinal length of the laminated glass Y is defined as $L_1$, a widthwise length is defined as $L_2$, and one vertex of the first surface is defined as vertex O, in the first surface of the laminated glass Y, installing an accelerometer at three positions: a position of $0.3L_1$ in the longitudinal direction and $0.3L_2$ in the widthwise direction from the vertex O, a position of $0.7L_1$ in the longitudinal direction and $0.5L_2$ in the widthwise direction from the vertex O, and a position of $0.6L_1$ in the longitudinal direction and $0.8L_2$ in the widthwise direction from the vertex O;
in each of the regions, exciting a middle position in the longitudinal direction and a middle position in the widthwise direction of the region in the first surface with an impact hammer, and calculating a transfer function; and
calculating a damping ratio at a resonance frequency of 50 Hz or more and 80 Hz or less according to the obtained transfer function.

2. The interlayer film for laminated glass according to claim 1, wherein the resin contained in the first layer has a molecular weight distribution ratio of weight average molecular weight to number average molecular weight of 8 or less.

3. The interlayer film for laminated glass according to claim 1, wherein the resin contained in the first layer has a glass transition temperature of 40° C. or more and 100° C. or less.

4. The interlayer film for laminated glass according to claim 1, wherein the first layer has a tan δ at a glass transition temperature of 1.2 or more.

5. The interlayer film for laminated glass according to claim 1, wherein the first layer has a tan δ at 200° ° C. of 0.5 or more.

6. The interlayer film for laminated glass according to claim 1, wherein the refractive index of the first layer is 1.470 or more and 1.510 or less.

7. The interlayer film for laminated glass according to claim 1, wherein the first layer contains a plasticizer.

8. The interlayer film for laminated glass according to claim 1 having a two or more-layer structure, the interlayer film including a second layer that is layered on a first surface of the first layer and contains a resin.

9. The interlayer film for laminated glass according to claim 8, wherein the second layer has a refractive index of 1.460 or more and 1.500 or less.

10. The interlayer film for laminated glass according to claim 8, wherein an absolute value of difference between a refractive index of the first layer and a refractive index of the second layer is 0.04 or less.

11. The interlayer film for laminated glass according to claim 8 having a three or more-layer structure, the interlayer film including a third layer that is layered on a second surface opposite to the first surface of the first layer and contains a resin.

12. A laminated glass comprising:
a first lamination glass member;
a second lamination glass member; and
the interlayer film for laminated glass according to claim 1,
the interlayer film for laminated glass being arranged between the first lamination glass member and the second lamination glass member.

13. A laminated glass comprising:
a first lamination glass member;
a second lamination glass member; and
an interlayer film for laminated glass having a one-layer or two or more-layer structure,
the interlayer film including a first layer containing a resin,
the laminated glass showing an optical strain value of 3.00 or less when subjected to measurement of optical strain, and showing a damping ratio of 5.0% or more at a resonance frequency of 50 Hz or more and 80 Hz or less when subjected to measurement of damping ratio,
the measurement of optical strain including:
preparing an optical strain inspection apparatus including a light source unit for emitting irradiation light, a projection plane for projecting the irradiation light having penetrated a measuring object, an image inputting part that photographs the projection plane to generate a gray image, and an image processing part that detects an optical strain in a longitudinal direction and in a widthwise direction of the measuring object on the basis of a degree of variation in shading of the gray image;
preparing as the measuring object, two measuring objects, namely, the laminated glass, and a laminated glass for calibration obtained by arranging a monolayer interlayer film for calibration having a visible light transmittance of 88% between two sheets of clear float glass having a thickness of 2.5 mm;
measuring an optical strain value of the laminated glass by using the optical strain inspection apparatus that is adjusted such that the optical strain value in a condition that no measuring object is placed is 1.30, and an optical strain value of the laminated glass for calibration is 1.14;
measurement conditions including an atmospheric temperature of 23° C. and a surface temperature of the measuring object of 25° C.; and
of the obtained optical strain value in the longitudinal direction of the measuring object, and the obtained optical strain value in the widthwise direction of the measuring object, a smaller optical strain value being determined as an optical strain value of the measuring object,
the measurement of damping ratio including:
dividing a first surface of the laminated glass into regions such that each region has a length of 5 cm or less and a width of 5 cm or less;
when a longitudinal length of the laminated glass is defined as $L_1$, a widthwise length is defined as $L_2$, and one vertex of the first surface is defined as vertex O, in the first surface of the laminated glass, installing an accelerometer at three positions: a position of $0.3L_1$ in the longitudinal direction and $0.3L_2$ in the widthwise direction from the vertex O, a position of $0.7L_1$ in the longitudinal direction and $0.5L_2$ in the widthwise direction from the vertex O, and a position of $0.6L_1$ in the longitudinal direction and $0.8L_2$ in the widthwise direction from the vertex O;
in each of the regions, exciting a middle position in the longitudinal direction and a middle position in the widthwise direction of the region in the first surface with an impact hammer, and calculating a transfer function; and
calculating a damping ratio at a resonance frequency of 50 Hz or more and 80 Hz or less according to the obtained transfer function.

14. The laminated glass according to claim 13, wherein the resin contained in the first layer has a molecular weight distribution ratio of weight average molecular weight to number average molecular weight of 8 or less.

15. The laminated glass according to claim 13, wherein the resin contained in the first layer has a glass transition temperature of 40° C. or more and 100° ° C. or less.

16. The laminated glass according to claim 13, wherein the first layer has a tan δ at a glass transition temperature of 1.2 or more.

17. The laminated glass according to claim 13, wherein the first layer has a tan δ at 200° ° C. of 0.5 or more.

18. The laminated glass according to claim 13, wherein the first layer has a refractive index of 1.470 or more and 1.510 or less.

19. The laminated glass according to claim 13, wherein the first layer contains a plasticizer.

20. The laminated glass according to claim 13, wherein the interlayer film has a two or more-layer structure, and the interlayer film includes a second layer that is layered on a first surface of the first layer and contains a resin.

21. The laminated glass according to claim 20, wherein the refractive index of the second layer is 1.460 or more and 1.500 or less.

22. The laminated glass according to claim 20, wherein an absolute value of difference between a refractive index of the first layer and a refractive index of the second layer is 0.04 or less.

23. The laminated glass according to claim 20, wherein the interlayer film has a three or more-layer structure, and the interlayer film includes a third layer that is layered on a second surface opposite to the first surface of the first layer and contains a resin.

* * * * *

UNITED STATES PATENT AND TRADEMARK OFFICE
CERTIFICATE OF CORRECTION

| | | |
|---|---|---|
| PATENT NO. | : 12,109,783 B2 | Page 1 of 1 |
| APPLICATION NO. | : 17/623011 | |
| DATED | : October 8, 2024 | |
| INVENTOR(S) | : Takeda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 333 days.

Signed and Sealed this
Twelfth Day of August, 2025

Coke Morgan Stewart
*Acting Director of the United States Patent and Trademark Office*